United States Patent [19]
Green

[11] Patent Number: 5,454,331
[45] Date of Patent: Oct. 3, 1995

[54] FURNITURE CONSTRUCTIONS

[76] Inventor: Douglas Green, 7 South St., P.O. Box 908, Yarmouth, Me. 04096

[21] Appl. No.: 165,260

[22] Filed: Dec. 10, 1993

Related U.S. Application Data

[63] Continuation-in-part of Ser. No. 906,430, Jun. 30, 1992, abandoned, and a continuation-in-part of Ser. No. 61,175, May 14, 1993, abandoned, and a continuation-in-part of Ser. No. 61,176, May 14, 1993.

[51] Int. Cl.$^6$ ........................................................ A47B 3/00
[52] U.S. Cl. ...................... 108/180; 108/193; 297/440.13
[58] Field of Search ..................... 108/153, 193, 108/100, 105; 297/440.1, 440.13, 440.23, 440.15, 440.20, 440.22

[56] References Cited

U.S. PATENT DOCUMENTS

| | | | |
|---|---|---|---|
| 2,543,875 | 3/1951 | Silverman | 297/440.13 X |
| 3,658,381 | 4/1972 | Grant, Sr. | 297/440.1 |
| 3,788,700 | 1/1974 | Waltes | 297/440.13 |
| 4,062,589 | 12/1977 | Klein et al. | 297/440.15 X |
| 4,077,517 | 3/1978 | Hilemn | 297/440.1 X |
| 4,302,048 | 11/1981 | Yount | 297/440.1 |
| 4,651,651 | 3/1987 | Sheffer | 100/180 |
| 5,022,721 | 6/1991 | Melgers | 108/180 X |

Primary Examiner—Jose V. Chen

[57] ABSTRACT

Articles of furniture are formed employing at least three members joined together by mortises and tenons of which one is a first member, when an additional member or members are needed, one such is the mirror image of the first member. In all disclosed embodiments, each first member or members has a first mortise which extends from one end margin at least part way towards the opposite end portion and a second mortise extending from the fist side margin towards the opposite side margin, intersecting the first mortise and extending beyond it. Another member has a tenon, for each first member extending part way along each side margin and is dimensioned to enable it to be entered in a first mortise and slid in one direction towards the opposite end portion of the first member into a position in which the second mortise thereof is unblocked and in the opposite direction into a position blocking the second mortise. An additional member has a tenon for each second mortise and can be slid therein with the another member in its first position and held therein when that member is in its second position, a mortise and tenon that connects said another and additional members. At least one of the mortise and tenon connections is a self-locking connection.

28 Claims, 24 Drawing Sheets

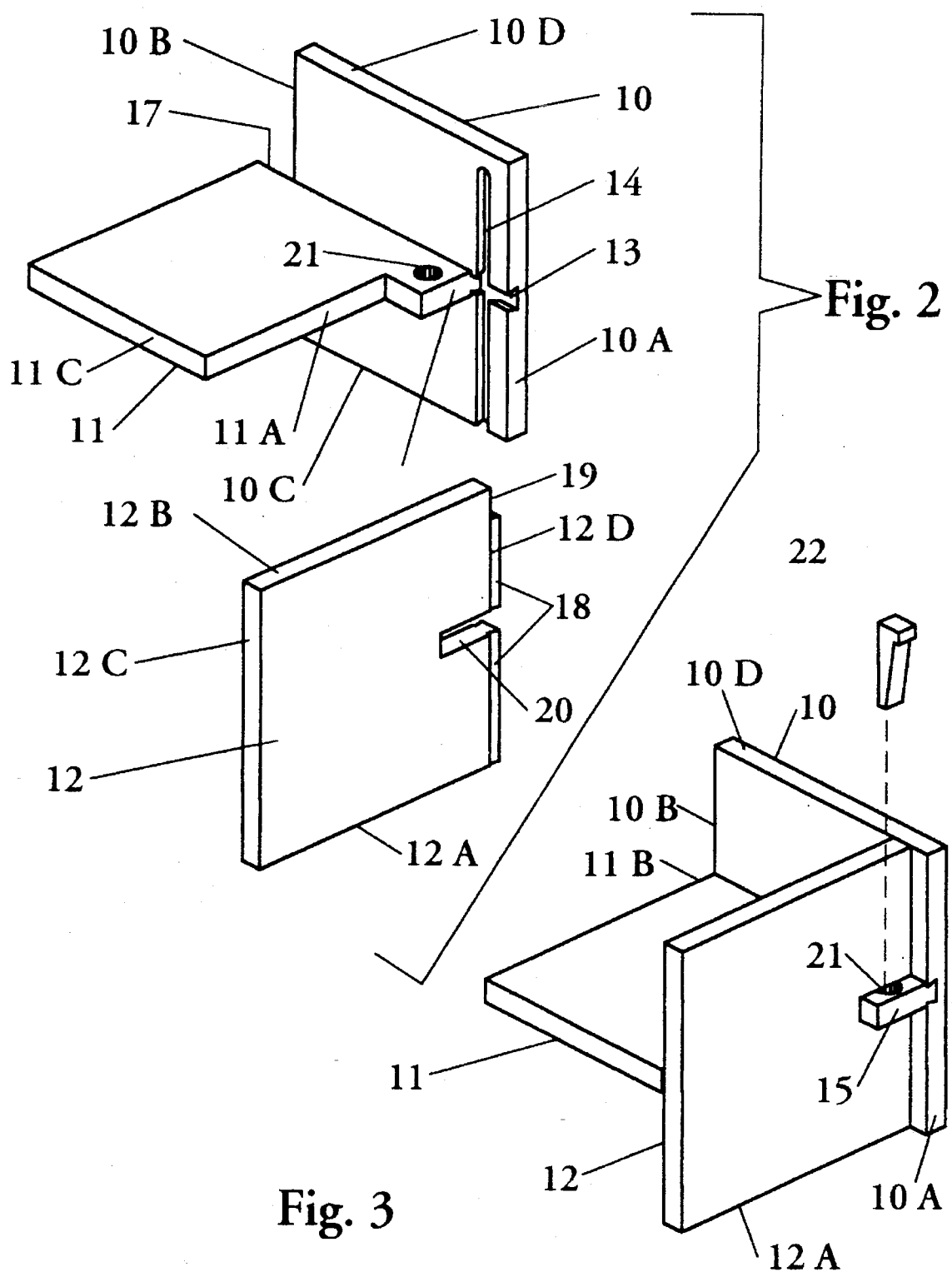

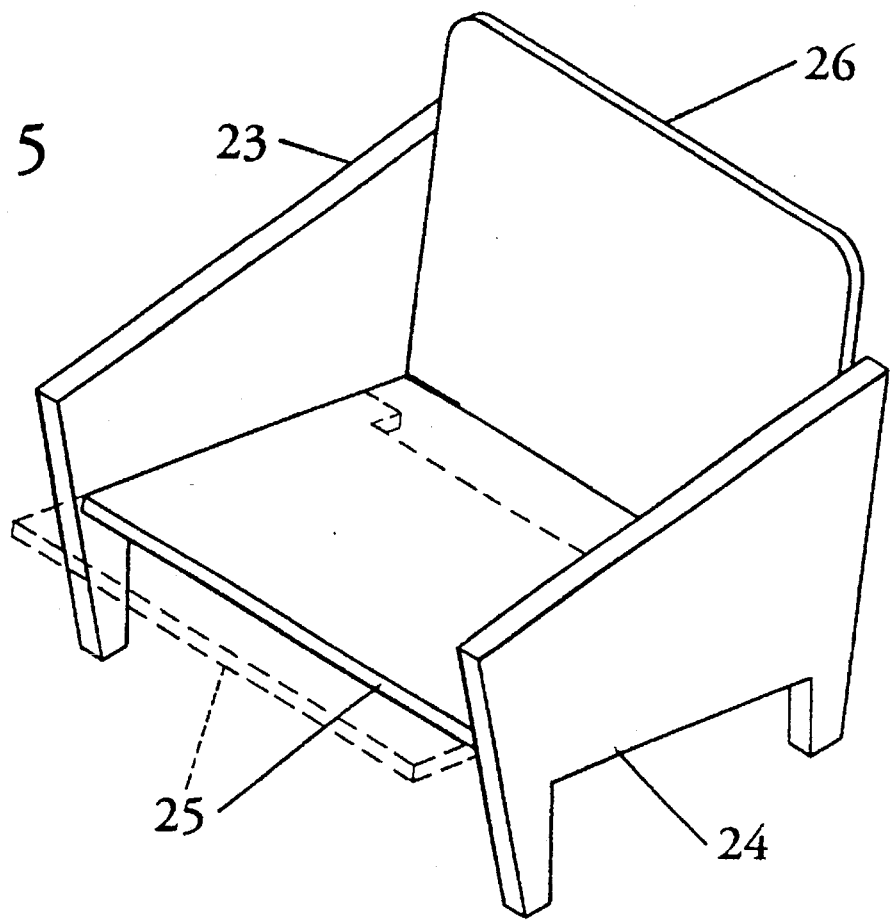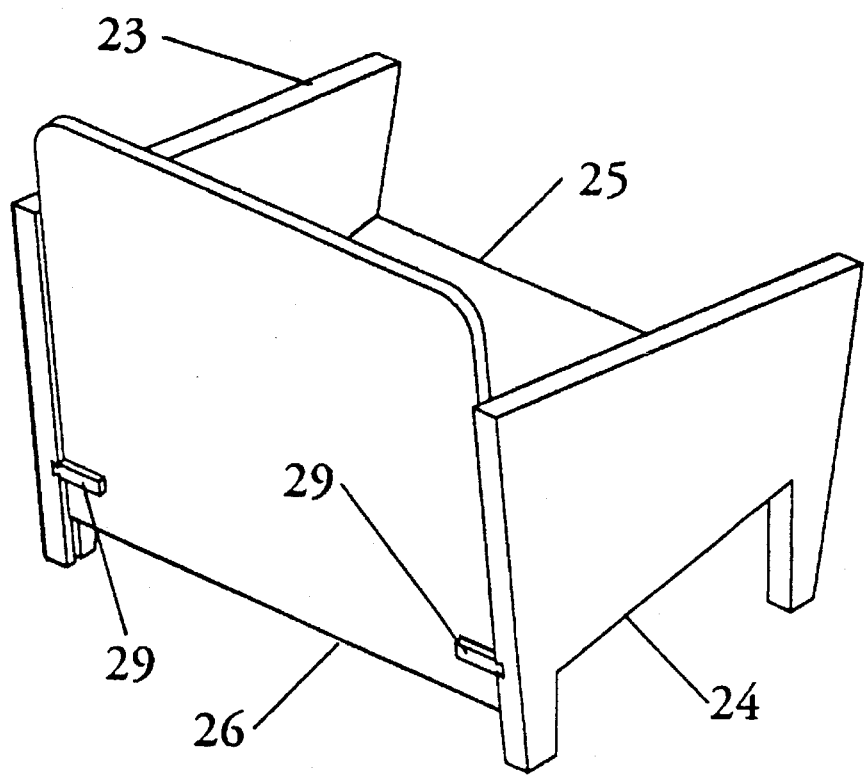

FURNITURE CONSTRUCTIONS

A continuation-in-part of the following applications: Furniture Construction, filed Jun. 30, 1992, Ser. No. 07/906, 430, now abandoned; Drawers and Assembly Kits Therefor, filed May 14, 1993, Ser. No. 08/061,175, now abandoned; and Bookcases and Tables and Assembly Kits Therefor, filed May 14, 1993, Ser. No. 08/061,176.

BACKGROUND OF THE INVENTION

Several proposals have been made to provide furniture that is ready to be assembled by the purchaser without requiring the use of metal fasteners.

Such proposals have relied on tongue and groove or interfitting open ended slots as the means of interconnecting the members required for the wanted article of furniture. While both types of connections enabled furniture to be easily assembled, either type of connection has the disadvantage that the exterior of the resulting article shows portions of the connections and reduces the aesthetic appearance.

SUMMARY OF THE INVENTION

In accordance with the present invention, the assembled products herein described are primarily articles of furniture consisting of a number of members joined in a predetermined order by mortises and tenons. A minimum of three members are required to form an article of furniture and each such members, the three members and each additional member needed to form other articles of furniture has a pair of opposite end margins, a pair of opposite side margins and opposite sides bordered by the end and side margins. Of these, one member, hereinafter called the first member, has a first mortise opening through one end margin and extending at least part way across that member towards the opposite end margin. The first mortise intersects a second mortise which opens through one side margin and extends beyond the first mortise towards the opposite side margin. In embodiments utilizing more than three members, there are two first members, sometimes referred to as first and fourth members, with each, the mirror image of the other. Initially, the first or first two members are connected by mortises and tenons to another or second member. Each subsequent member, when added to the partial assembly or to a subsequent partial assembly locks the previously connected members against unwanted movements.

The term members, as used herein denotes wooden members or members of other materials such that each two members which are to be connected have margins of complemental sizes and shapes such as to enable them to be interconnected by mortises and tenons. It is preferred, however, that such portions be formed in flat surfaces or along straight edges thereof. The maximum advantages of the invention is attained if both surfaces are flat and, for most constructions, the members are rectangular. Other materials which may be of use are, for examples, plastic, glass and man-made materials such as laminates or particle boards.

The terms mortises and tenons, as used herein, include mortises and tenons which are of cross sectional sizes and shapes requiring that members provided therewith can be joined only with one end of a tenon entered in an end of a mortise with the joint completed by relative sliding movement of the members to a wanted extent. The tenons need not be of the same length as the mortises. Such mortises and tenons are identified as self-locking mortises and tenons and, when either a mortise or a tenon is thus described, the other, without being so identified is also self-locking.

The term mortises and tenons also includes those of tongue and groove types with which a joint between two members may be formed either by relative sliding movement of the members with the tenon entered in one end of the mortise or by introducing the tenon laterally into the mortise. As such joints may be separated by pulling them apart, their mortises and tenons are called non-locking mortises and tenons and when either is so described, the other is also non-locking without being so named. Non-locking mortises and tenons may also be of types in which the mortises are short grooves or slots with the tenons being shaped and dimensioned to fit such grooves or, in the case of slots, to extend therethrough.

The last member incorporated in an assembly to complete the product is usually locked in place with the locking means between that member and an adjacent, previously secured member. Such locking means may, for example, be a non-locking mortise and tenon if one of the thus connected members is sufficiently flexible to enable the tenon to be entered in the mortise or the locking means may consist of a locking wedge between those members or a pin confined in vertically aligned bores therein.

The principles of the invention are most readily appreciated by considering the formation of an article of furniture formed by three members of which one is a first member having both mortises of the self-locking type, a second member has a self-locking tenon extending from one end portion along one side towards but terminating short of the other end portion with the length of the tenon not in excess of the distance from the closed end of the first mortise to the intersection of the mortises so that the tenon may be inserted in the first mortise to connect the second member to the first member without blocking the second mortise in order that the self-locking tenon of a third member may be slid into the second mortise, through the intersection into a position in which it will be held when the second member is slid relative to the first member into a position in which the tenon obstructs the second mortise. When the second member is thus positioned, a projection on said one end portion thereof, which includes a portion of the tenon, extends into or through a slot in the third member which serves as a mortise interconnecting the second and third members and completing the assembly which may be a stand or table.

With an additional or fourth member, which is the mirror image of the first member, and with the opposite side portion of the second member provided with a self-locking tenon, identical to the first named mortise of the second member, the second and fourth members are connected as by means such as have been described with articles of furniture assembled from such four members chairs, love seats and sofas.

In accordance with the invention, other articles of furniture may be assembled by the use of additional fifth members ranging, for example, from boxes, drawers, bookcases and tables.

When a box or drawer is to be made, the two members which are the sides have the first and second mortises with the first mortises being non-locking mortises extending lengthwise of the sides adjacent the bottom of the side margins. The second mortises are self-locking and are located adjacent the front margins of the sides.. Each side has a self-locking tenon adjacent its rear margin which extends from the bottom margin towards but terminates short of the upper margin. The front of the drawer has a self-locking mortise adjacent each end margin which extends from the bottom margin towards but terminates short of the upper margin, the front a transverse, non-locking mortise parallel and close to the bottom margin which opens into each self-locking mortise of the front. The member which is the back has a self-locking tenon at each end extending from the bottom margin towards but terminating short of the upper margin. The bottom of the drawer is dimensioned so that, with the front connected to the sides with the tenons of the back seated in the second mortises of the sides, the first mortises are not obstructed if the tenons of the back are seated against the closed ends of the second mortises of the sides. The sliding entry of the bottom into the first mortises of the sides is then permitted and the seating of the forward end of the bottom in the transverse mortise of the front results in the rearward end of the bottom blocking the second mortises and locking the assembly together.

The first members are the drawer sides, the bottom is the second member and the back is the third member and provide the assembly functions of the three members of the previously summarized embodiment.

In the manufacture of a table, bookcase or stand, each of the two sides has first and second intersecting, self-locking mortises with the second mortise extending from the upper margin downwardly towards the opposite or bottom margin but terminating short thereof. Each side also has a self-locking tenon extending from the rear margin adjacent the bottom margin which is intersected by the second mortise and terminates short of the front margin.

The member which constitutes a shelf has a self-locking tenon at each side margin extending from the rear margin forwardly but terminating short of the front margin. A back has at each side margin a self-locking tenon extending from end to end thereof with the two tenons intersected by a transverse, open ended non-locking mortise adjacent the bottom margin of the back. The last member is the top which has parallel, self-locking mortises commencing at the rear margin and terminating short of the front margin with each mortise disposed to receive and slidably hold the appropriate one of the tenons of the side members.

With the shelf in a forward position, the back, when its tenons have been entered in the second mortises of the side member, can be slid downwardly until seated against the bottom of the second mortises with the upper margin of the back slightly below the upper edges of the sides. The first mortises of the sides are then blocked. If the back is raised the shelf may have its tenons entered in the first mortises of the sides until a transverse mortise, opening through the side margins of the shelf underlies the back which, if now lowered, is entered by the bottom margin of the back which then serves as a tenon. The back now holds the shelf against moving and the upper edge of the back and the top are releasably locked together.

The intersecting mortises of the side, the shelf and the back have, accordingly, the same assembly functions as in the other embodiments.

Tables are shown in the drawings as having similar five members but with the shelf having a transverse, non-locking mortise adjacent its rear margin. The side margins of the back serve as non-locking tenons as the second mortises of the sides are non-locking. The top is similar to the top of the stand or case just summarized but has a transverse non-locking mortise which overlies the second mortises when the top has been slid forwardly as far as possible. With the back raised to permit the shelf to be slid rearwardly, the transverse tenon of the bottom margin of the back, enters the transverse mortise of the shelf with the top margin of the back serving as a tenon entering the transverse, non-locking mortise of the top. It will be appreciated that the two sides, the back and the shelf perform the essential functions of all of the previously summarized embodiments.

It is usually desirable to lock completed assemblies against unintended movement of the last member to be connected which then completes the assembly. Such locking can be effected in various ways with each embodiment illustrated by the drawings showing a presently preferred way of so doing.

These and other novel features and advantages will be apparent from the accompanying drawings of presently preferred embodiments, the following description thereof and the claims.

BRIEF DESCRIPTION OF THE DRAWINGS

The foregoing and other objects, features and advantages of the invention will be apparent from the following, more particular description of preferred embodiments of the drawings in which like but distinguished reference characters refer to the corresponding parts throughout the different views. The drawings are not necessarily to scale, emphasis instead being placed upon illustrating the principles of the invention.

FIG. 2 is a perspective view of the partly assembled table.

FIG. 3 is a perspective view of the completed table.

FIG. 5 is a front perspective view of an assembled chair.

FIG. 6 is a perspective view of the chair as seen from the rear.

DETAILED DESCRIPTION OF THE PREFERRED EMBODIMENTS

Figure 1:
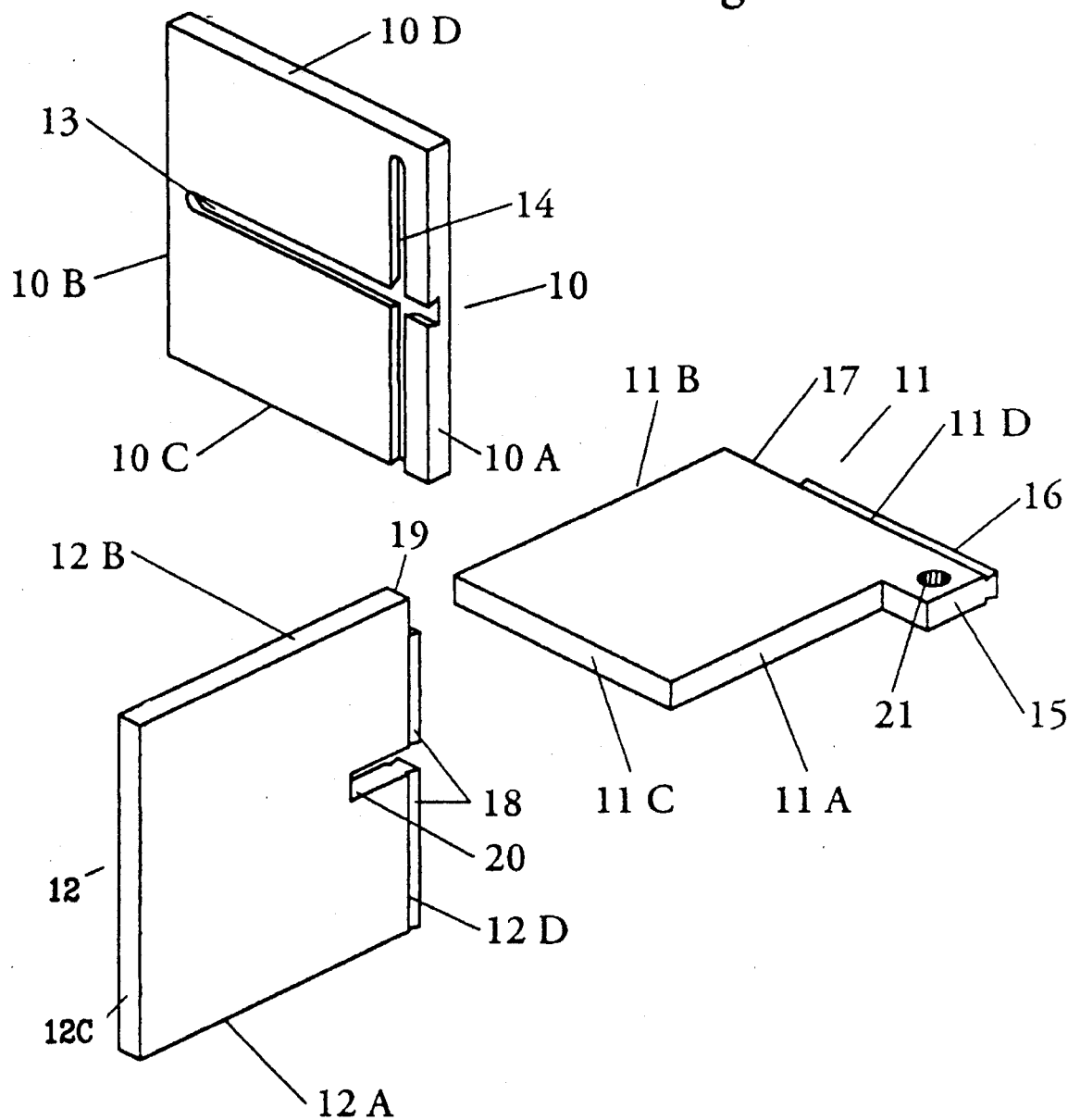
FIG. 1 is an exploded view of the components by which a table can be formed.

The three ready to assemble components of a table or a stand and the formation of the table therefrom are illustrated by FIGS. 1–3. The three components are shown as flat-surfaced wooden members with one member, the first member 10, constituting the top of the table and the members 11 and 12 constituting, respectively, the second and third members and constituting supports therefor. Each of the three members has a pair of opposite end margins, a pair of opposite side margins and opposite sides bordered by the end and side margins.

The table top, the first member 10, is shown as having its undersurface provided with a straight, self-locking mortise 13 which is a dove tail in cross section. The mortise 13 opens through the first end margin 10A and extends towards but terminates short of its opposite or second end margin 10B. The mortise 13 is intersected by a straight self-locking mortise 14 adjacent the end margin 10A, shown as of the same cross sectional shape, which opens through the side margin 10C of the table top 10 and extends towards but terminates short of the opposite side margin 10D.

The second member 11 is the first support for the table top 10 and has a non-locking rectangular tenon 15 protruding from its first end margin 11A in a position which renders the length of the first support 11 between the end margin 11A and the opposite or second end margin 11B, when measured along the side margin 11C less than the distance from the extremity of the tenon 15 along the side margin 11D to the end margin 11B. The side margin 11D has a projecting dove tail tenon 16 dimensioned to be in a sliding fit in the self-locking mortise 13 with the tenon 16 terminating short of the second end margin 11B leaving the side margin 11D a flat end margin 17. For reasons which will presently be apparent, the length of the tenon 16 must not exceed the length of the mortise 13 between the closed end thereof and the intersecting mortise 14. The tenon 16 is preferably less than that length.

The first step in the assembly of the table is to attach the second member 11 to the table top 10 as by holding the second member 11 in a position such that with the flat end portion 17 of the second member against the table top 10 and the tenon 16 aligned with the mortise 13, the tenon can be slidably entered therein. The second member 11 is then pushed towards the second end margin 10B of the table top 10 until it does not obstruct the mortise 14. That position of the second member 11 is sometimes referred to as its first operative position.

The third member 12 is the second support and has a projecting dove tail tenon 18 dimensioned to be slidable in the self-locking mortise 14. The tenon 18 extends from its first end margin 12A along the side margin 12D towards but terminating short of its second end margin 12B thus leaving the side margin 12D with a flat end portion 19. The tenon 18 is intersected by a slot or moritse 20 the depth of which is equal to the width of the rectangular tenon 15 of the first support 11.

The table is completed by connecting the third member 12 to the table top 10 by placing the flat end portion 19 thereof against the table top 10 in a position such that the tenon 18 may be slidably entered in the mortise 14. The third member 12 is then pushed towards the side margin 10D of the table top 10 until the tenon 18 is seated against the closed end of the mortise 14. The slot or mortise 20 is then positioned to receive the rectangular tenon 15. The second member 11 is then advanced into a second position towards the first end margin 10A of the table top 10 until the first end margin 11A butts against the third member 12 with the extremity of the tenon 15 exposed through the slot or mortise 20.

The assembled table is then turned to be supported by the members 11 and 12 with the side margins 11C and 12C then coplanar. The assembled table can come apart only by returning the second member 12 to its first position. For some uses, the exposed end of the rectangular tenon 15 may be bored to provide a hole 21 which will be sufficiently exposed, when the table is assembled, see FIG. 3, to enable a wedge pin, or key 22 to be driven into it to releasably lock the three members together.

Figure 4:
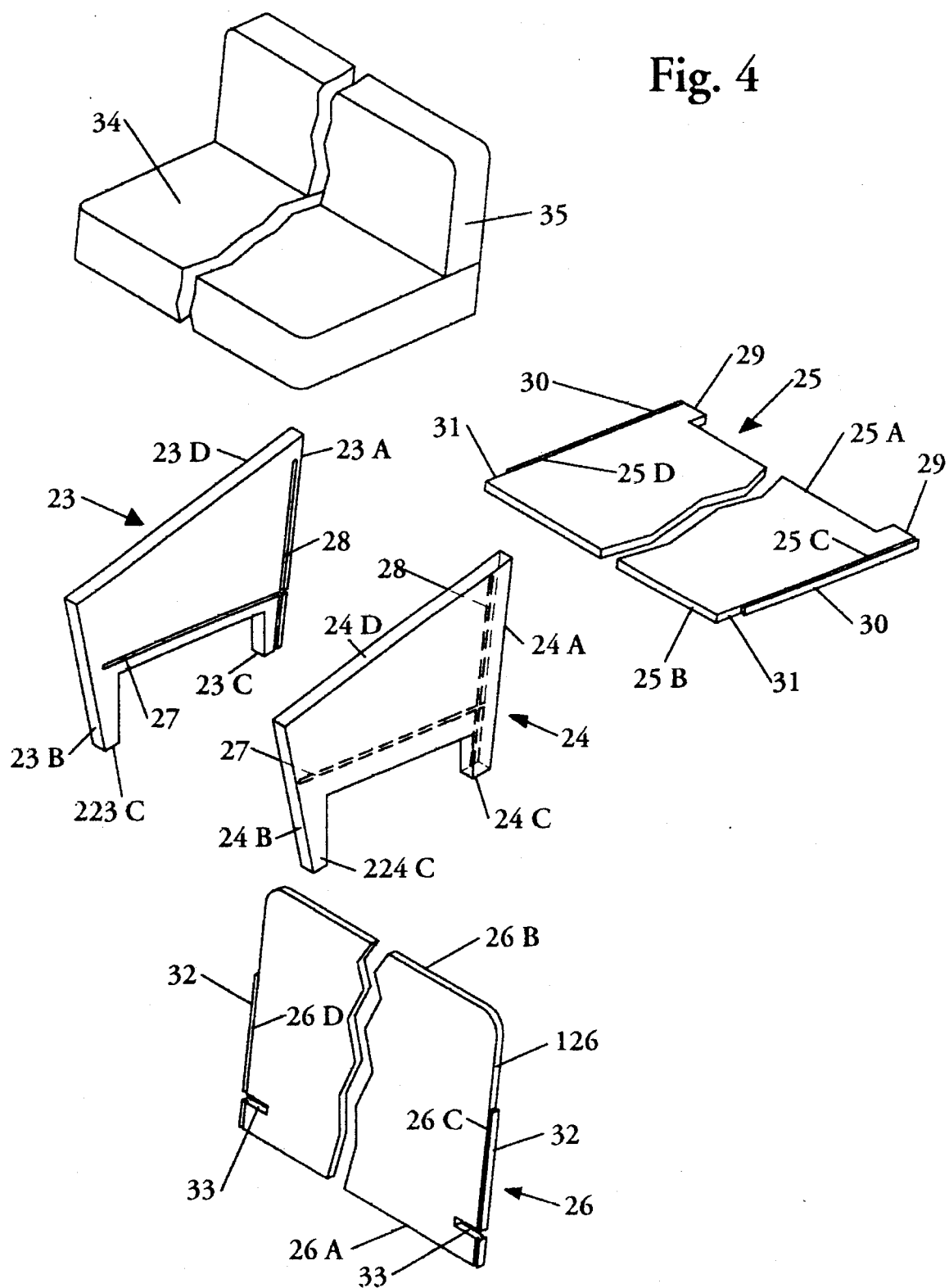
FIG. 4 is an exploded view of the components enabling a chair, love seat or sofa to be formed therefrom.

In another preferred embodiment, the four ready to assemble components of a chair, love seat or sofa are shown in FIG. 4. These consist of two members 23, 24 which are to serve as the sides of a chair or the ends of a love seat or sofa with each the mirror of the other at least with respect to assembly features. Another member 25 becomes, on assembly, the bottom of such articles of furniture and the member 26 becomes the back thereof. As the only structural difference between the above types of furniture is in the width of their seats and the length of their backs, only the assembled chair of FIGS. 5 and 6 is shown.

Each side 23, 24, like the table top 10, has a straight self-locking mortise 27 which extends from its first or rear margin 23A, 24A towards but terminates short of its second or front margin 23B, 24B. Each mortise 27 is intersected by a self-locking mortise 28 extending from the margin of its rear legs 23C, 24C towards but terminating short of its upper margin 23D, 24D. Each side 23, 24 also has a front leg 223C, 224C. The sides 23, 24, due to their similarity to the table top 10, the first member of the embodiment of FIGS. 1–3, are called, for convenience, the first and fourth members, respectively.

The seat 25 is shown as having a central recess in its first or rear margin 25A establishing a pair of rectangular, rearwardly disposed marginal portions which also serve as tenons 29. The seat 25 is also comparable to the first table support 11 in that its tenons 30, are self-locking to be slidably confined in the mortises 27 and extend along its side margins 25C and 25D from the end 25A thereof and terminate short of the outer margin 25B and establish flat end portions 31. The length the self-locking tenons 30 is limited by the distances between the closed ends the mortises 27 and the intersecting mortises 28 and, in practice, its length is slightly less than that distance. The seat 25 is sometimes referred to as the second member.

To assemble the chair, the first step is to place the flat portion 31 of one side margin 25C, 25D against the inner surface of one chair side 23, 24 with its tenon 30 positioned to be slid into the mortise 27 thereof. The seat 25 is then slid relative to the appropriate one of the chair sides until the associated tenon 30 does not block the associated mortise 28 and then establishes the first position of the seat 25.

The other side 23, 24 is then connected to the seat 25 as by placing that side 23, 24 against the exposed flat end portion 31 of the exposed side of the seat with its self-locking mortise 27 held in a position to receive the available tenon 30 as the side 23, 24 being slid is slid towards the rear margin of the seat 25 until it is in a position in which the mortise 28 is not obstructed with the seat 25 then in its first position relative to both sides 23 and 24.

The back or fourth member 26 has a self-locking tenon 32 extending along each side edge 26C and 26D from its bottom or first end 26A towards but terminating short of its upper or second end 26B thus establishing flat end portions 26E. Each tenon 32 is intersected by the appropriate one of the transversely aligned slots or mortises 33. Each slot or mortise 33 is dimensioned to slidably receive the appropriate one of the rectangular tenons 29 when the seat 25 is pushed rearwardly from its first operative position into its second operative position with its first end margin 25A butted against the chair back 26. The chair is thus held assembled and is supported by the front and rear legs of the sides 23, 24. Seat and back cushions 34 and 35 are then added. The back and seat may be releasably locked together in the same manner as the second and third members of the previously described embodiment.

Another embodiment of the present invention illustrated in FIGS. 7–15 is a drawer or box 110 consisting of five, flat surfaced and rectangular wooden members.

Two of the members are sides and as each is the mirror of the other and has the same assembly features, both side walls are generally indicated at 111 and are hereinafter sometimes called side walls or first and fourth members. The assembly features are in the surfaces of the side walls 111 which are the interior surfaces of the assembled drawer 110, see FIG. 8. Such features include a self-locking tenon 112 at the first end margin 111A of each side wall 111 which extends from the bottom margin 111D towards but terminates short of the upper margin 111C.

Another assembly feature of each side wall 111 is a self-locking mortise 113 close to and parallel to the second margin 111B which extends through the bottom margin 111D upwardly towards the upper margin 111C but terminates short thereof. In addition, each of the side walls 111 has a groove or channel 114 which is a non-locking mortise, adjacent and parallel to the bottom margin 111D. Each mortise 114 opens through the end margins 111A and 111B and intersect the self-locking mortise 113.

Figure 7:
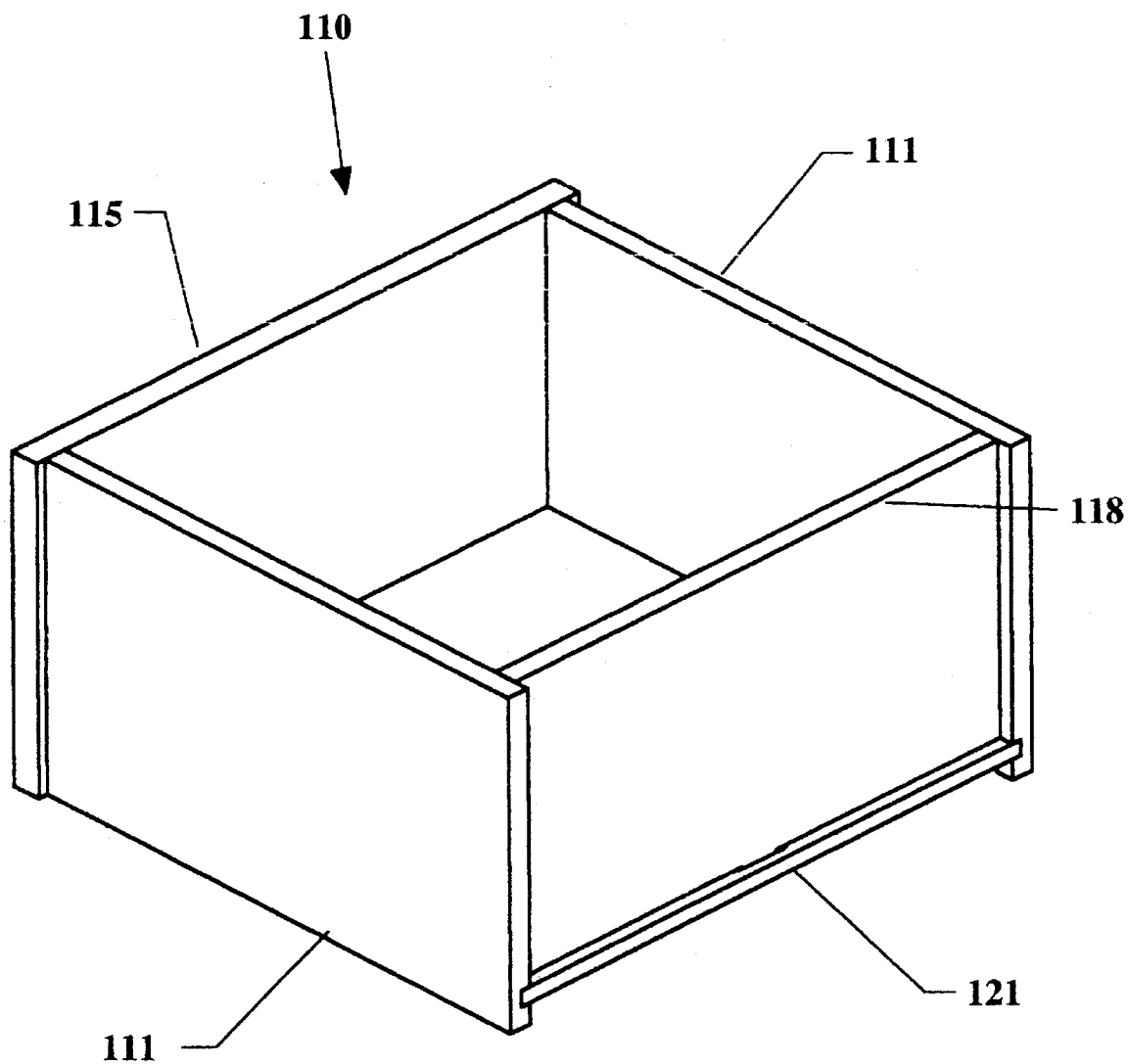
FIG. 7 is a perspective view of an assembled drawer.
Figure 8:
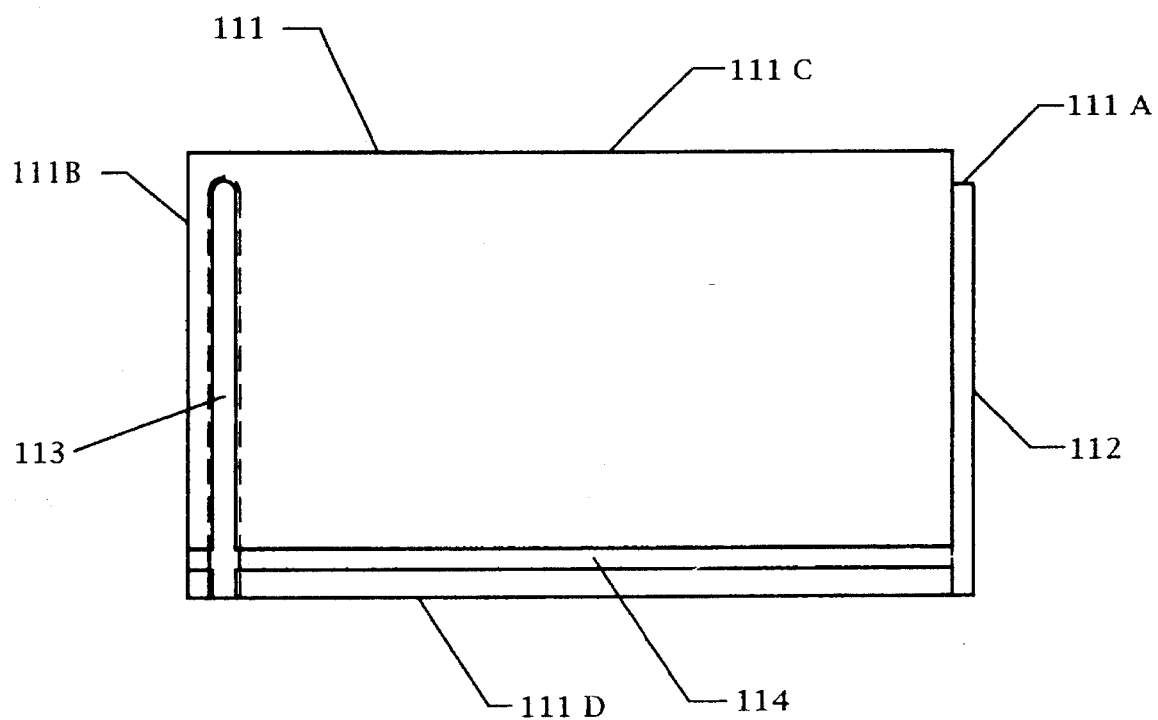
FIG. 8 is a plan view of the surface of one of the two like side walls showing assembly features.
Figure 9:
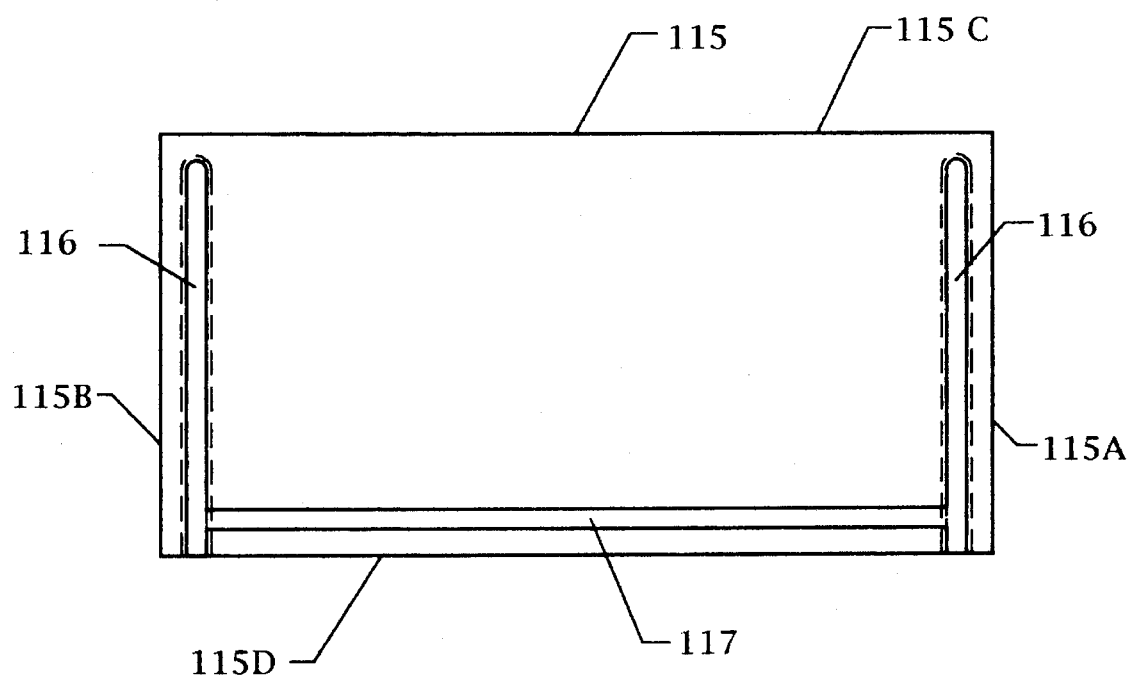
FIG. 9 is a like view of the front wall.
Figure 10:
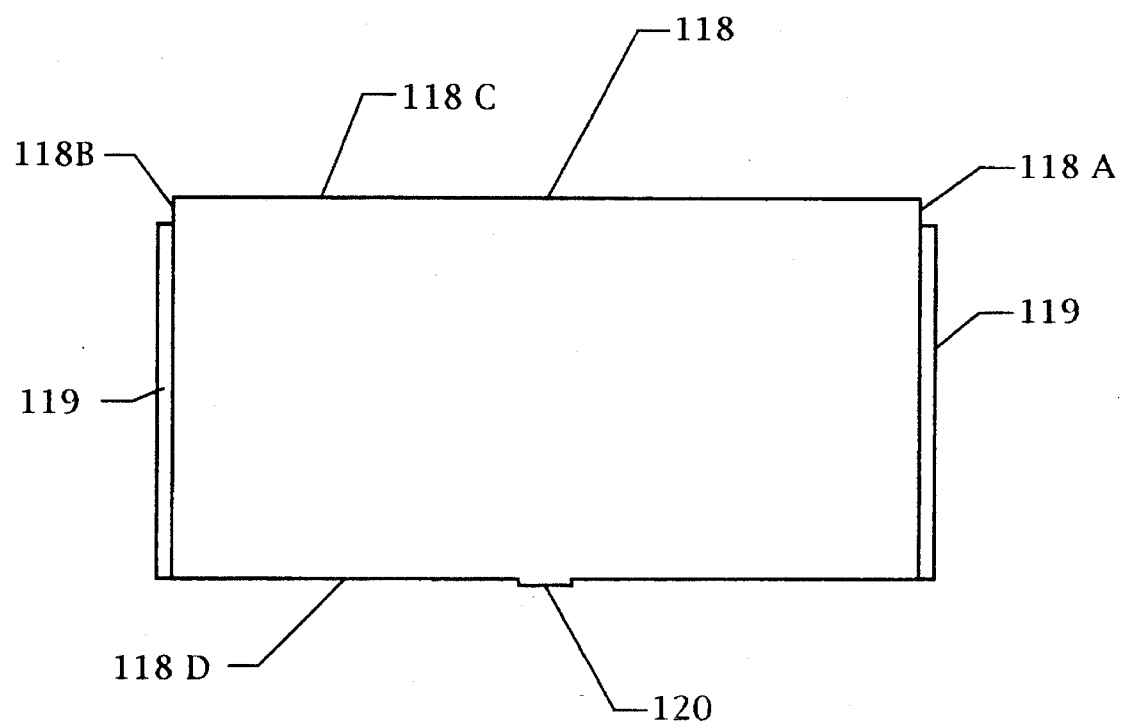
FIG. 10 is another like view showing the assembly features of the back wall.
Figure 11:
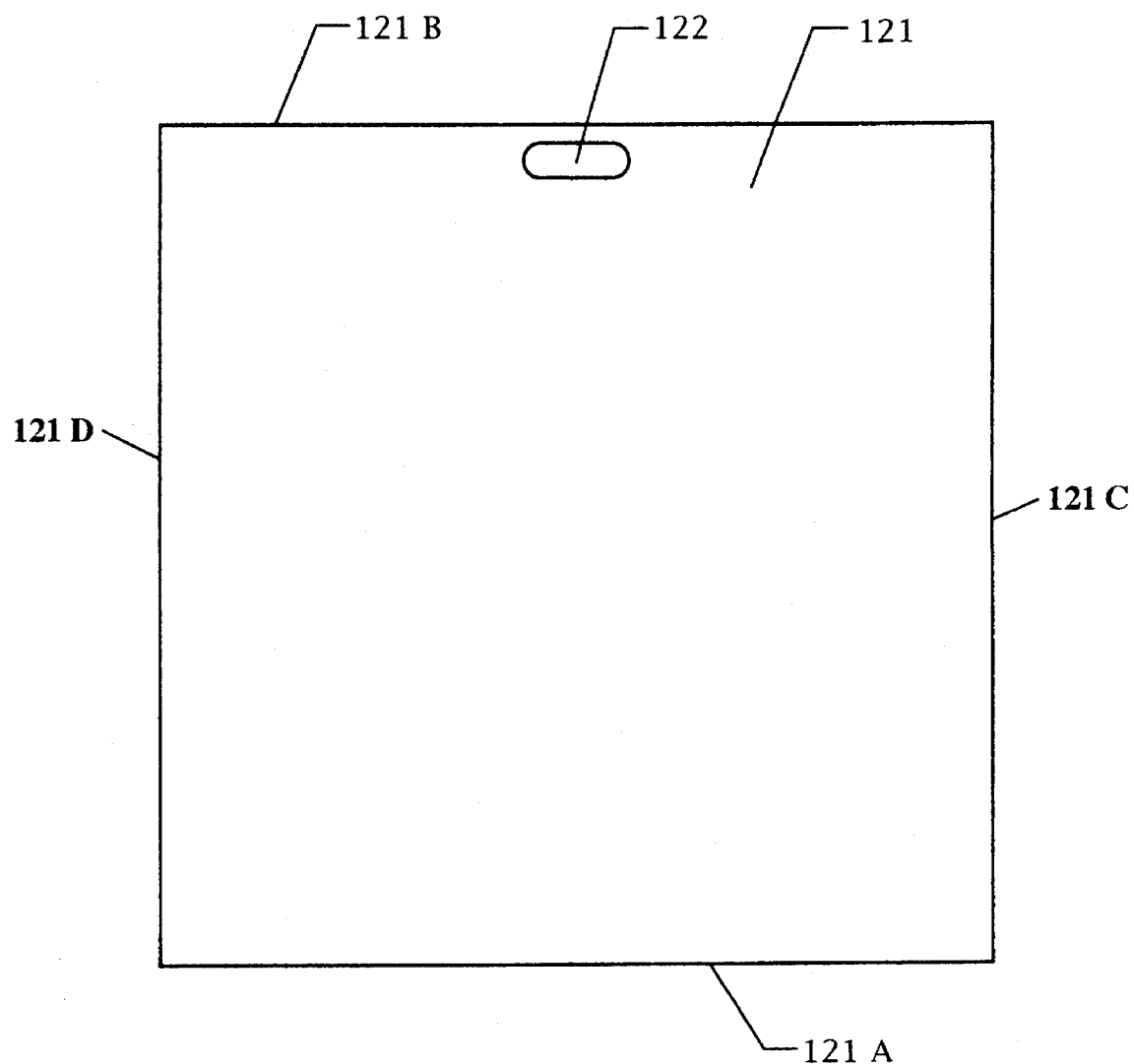
FIG. 11 is a plan view of the drawer bottom.

A second member, generally indicated at 115, is hereinafter called the front wall and has, see FIG. 9, parallel self-locking mortises 116, one adjacent each of the end margins 115A, 115B. Each self-locking mortise 116 extends from the bottom margin 115D towards but terminates short of the upper margin 115C. The front wall 115 also has a transverse channel or groove 117 adjacent and parallel to the bottom margin 115D and opening into the self-locking mortises 116. On assembly each self-locking mortise 116 receives the appropriate one of the self-locking tenons 112 of the first and fourth members and when these are seated against closed ends of the self-locking mortises, the channels 114 and 117 are in the same plane. As shown in FIG. 7, the front wall 115 is so dimensioned that its end margins 115A, 115B protrude slightly beyond the side walls 111 as is often required of a drawer. The self-locking mortises 116 of the front wall 115 and the self-locking mortises 113 and tenons 112 of the sides 111 are of the same length.

A third member becomes the rear or back wall, generally indicated at 118, of the drawer 110 when assembled and has a self-locking tenon 119 at each end margin 119A, 119B. Each self-locking tenon 119, see FIG. 10, extends from the bottom margin 118D of the back wall 118 towards but terminates short of the upper margin 118C. The self-locking tenons 119 are of the same length as the self-locking mortises 113 of the second and fourth members. On assembly, the serf-locking tenons 119 are entered in the open ends of the self-locking mortises 113 and seated against the closed ends thereof. An additional feature of the back wall or third member 118 is that it has a tab or tenon 120 located centrally of the bottom edge 118D.

The fifth member, generally indicated at 121, is the base or bottom of the drawer 110 and is of a width, length and thickness to enable its side margins 121C and 121D (see FIG. 11) to serve as tenons to be slidably entered in the non-locking mortises 114 of the sides 111 and advanced therein until the first end margin 121A is seated in the channel 117 of the front wall or second member 115 with the second end margin 121B under and supporting the back wall 118 which is the third member. It will be readily appreciated that the tab 120 of the back wall 118 blocks that path of the drawer bottom 121 when connected to the side walls 111 which are the first members. In practice, the bottom 121 is sufficiently resiliently flexible that it may be centrally depressed manually to an extent such that the drawer bottom 121, the fifth member, can be advanced under the tab 120 to complete the drawer and it will be noted that the drawer bottom 121 has a socket or mortise 122 located to receive the tab 120 once the drawer bottom 121, is in place. The length of the socket is shown as somewhat greater than that of the tab.

Figure 12:
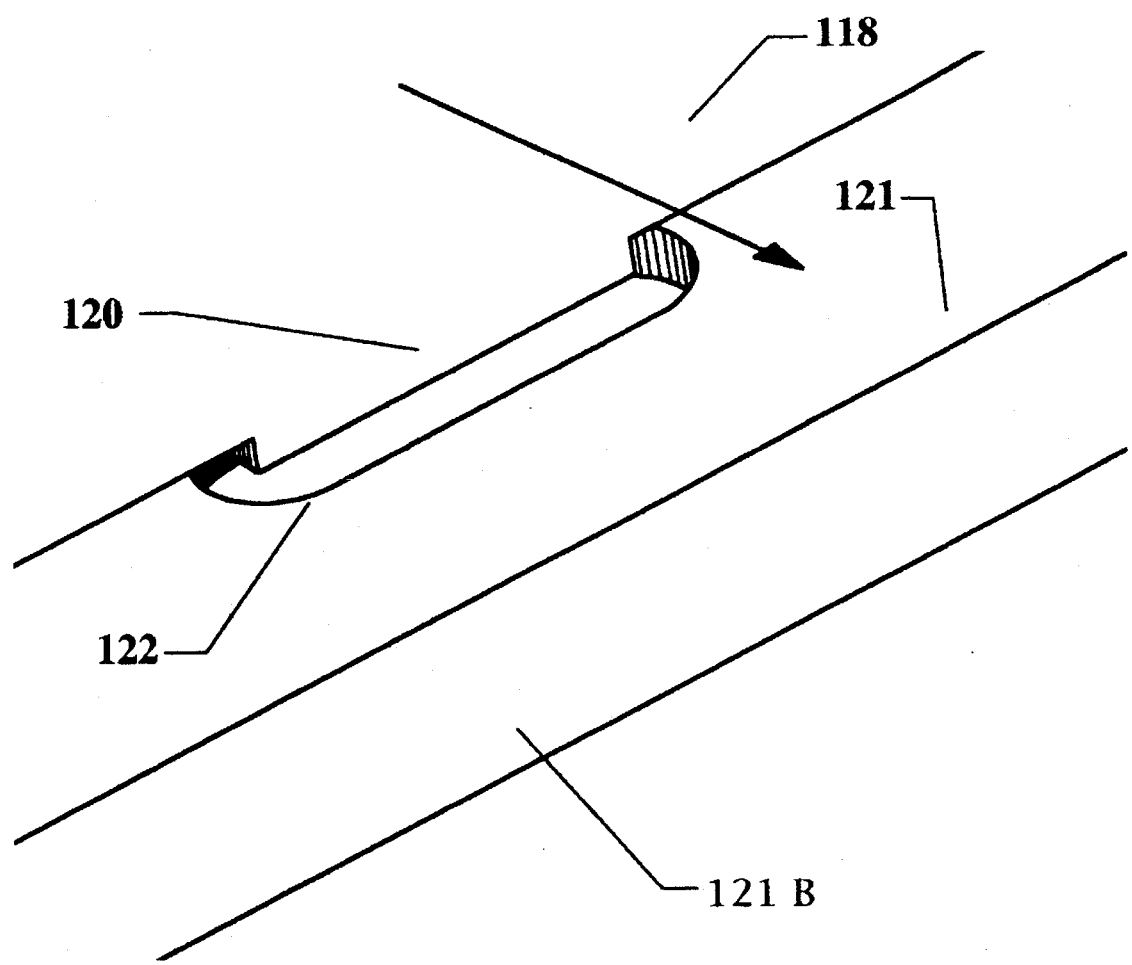
FIG. 12 is a fragmentary perspective view showing the completed connection between the back wall and the draw bottom.

It is preferred that the socket 122 be offset slightly rearwardly of the tab 120 and that the back wall 118, the third member, be sufficiently resiliently flexible to enable it to be so flexed manually that it snaps into the socket 122 thus exerting pressure, locking and seating the drawer bottom 121 tightly in the channel 117, and locking the assembly together, see FIG. 12.

Figure 13:
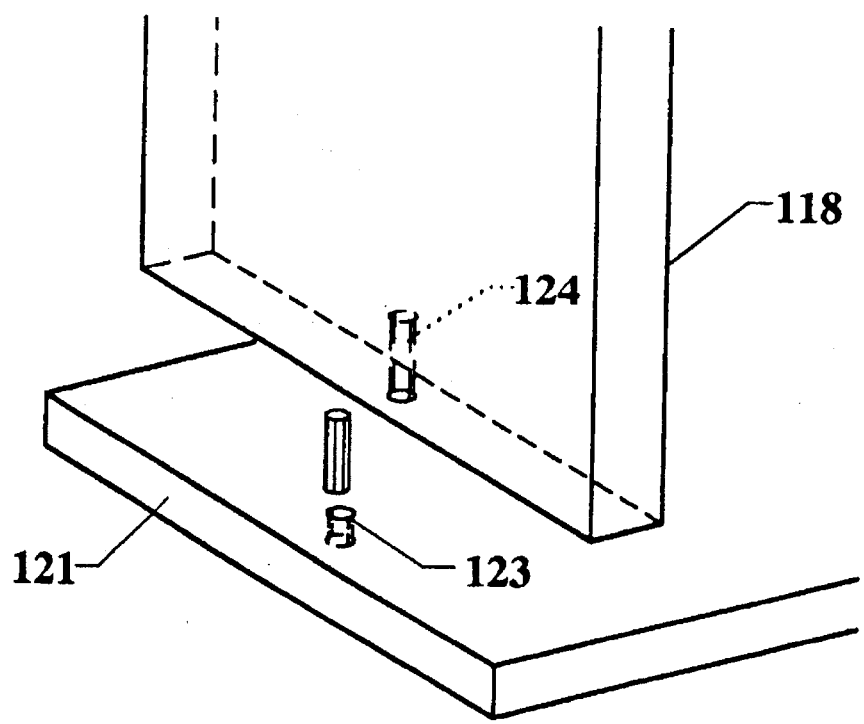
FIG. 13 is a fragmentary perspective of the back wall and the drawer bottom utilizing a separate-locking element.
Figure 14:
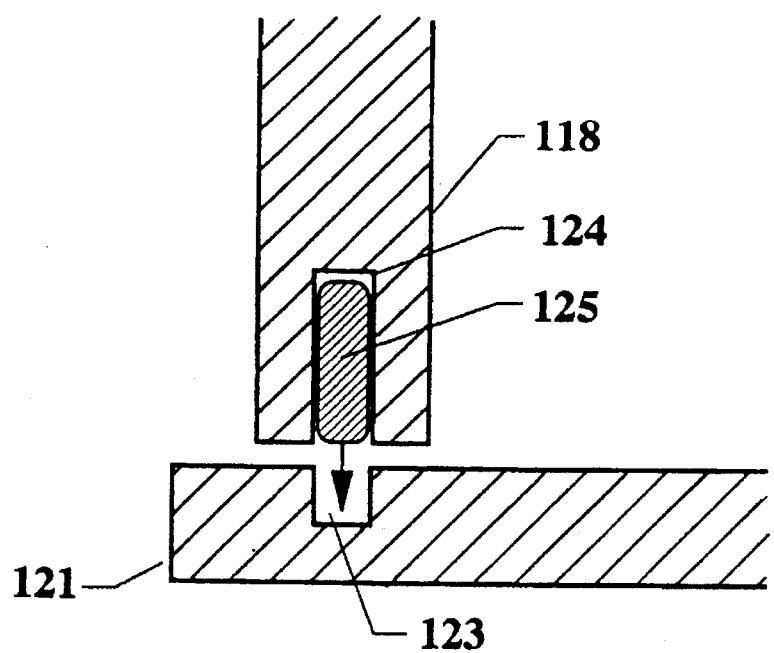
FIG. 14 is a fragmentary section taken vertically through the back wall and the drawer bottom showing the locking element and the bores for the element.
Figure 15:
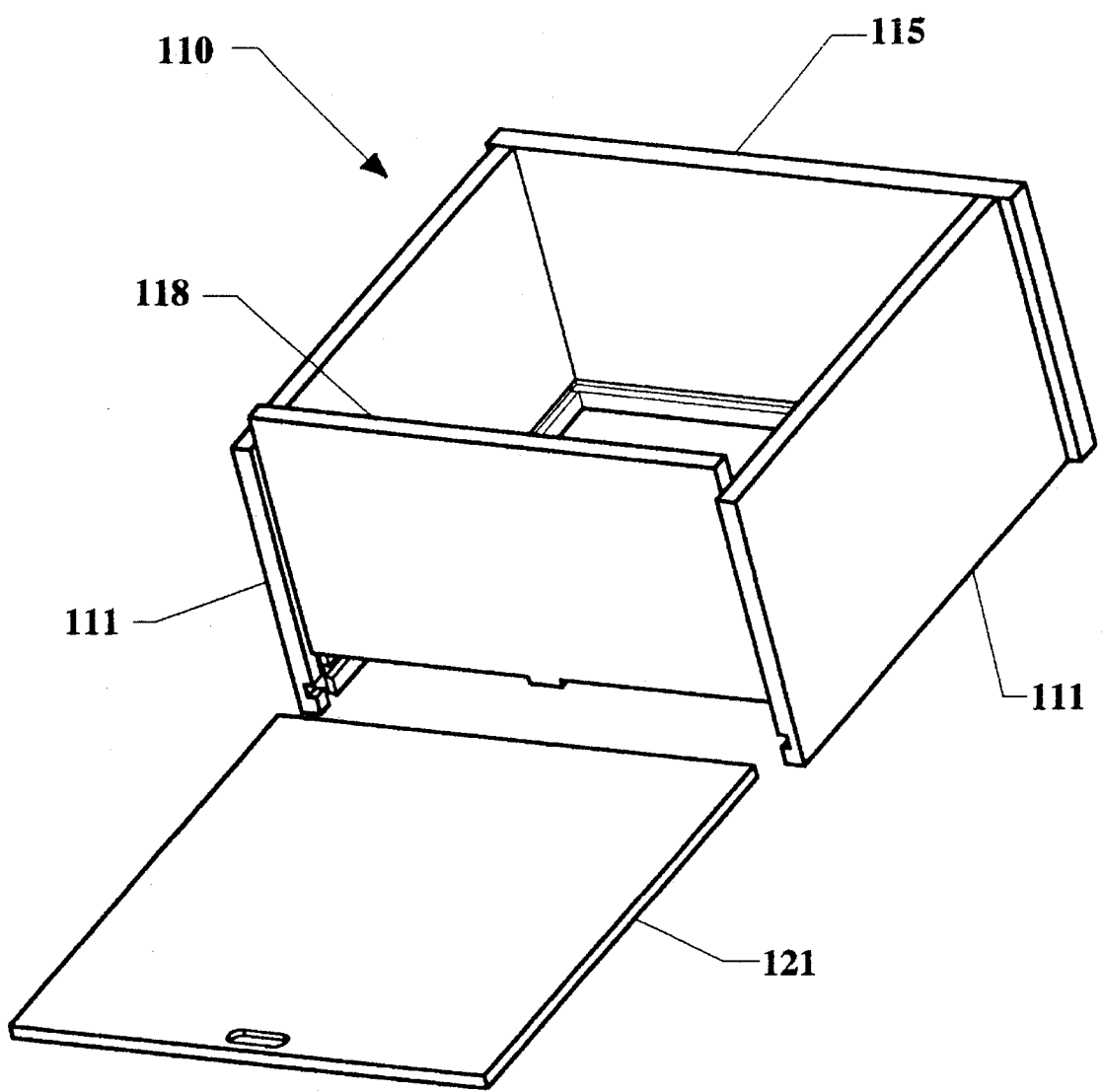
FIG. 15 is a perspective view of a partly completed assembly illustrating yet another construction by which the drawer bottom and back wall can be connected.

Alternatively, as illustrated by FIGS. 13 and 14, the drawer bottom 121, the fifth member, can have an upwardly opening bore 123 while the back wall 118, the third member, can have a downwardly opening bore 124 which registers with the bore 123 when the drawer bottom 121 is in its seated position. A locking element 125 is dimensioned so that, with one end seated in the bore 123, its other end enters the bore 124 locking the drawer bottom 121 against movement. The locking element 125 may initially be in either bore and is usually a length of metal rod stock so that if contained initially in the bore 124 with the assembly inverted, it will slide into the bore 124 when the assembly is returned to its position for use.

For uses where the back wall 118, the third member, has a tab and the drawer bottom has a tab receiving socket and it is not desired to lock the drawer bottom against movement, the self-locking tenons 119 of the back wall 118 are sufficiently shorter than the self-locking mortises 113 of the side walls to permit the back wall 118 to be so raised as to permit the drawer bottom 121 to pass under the tab 120.

Figure 16:
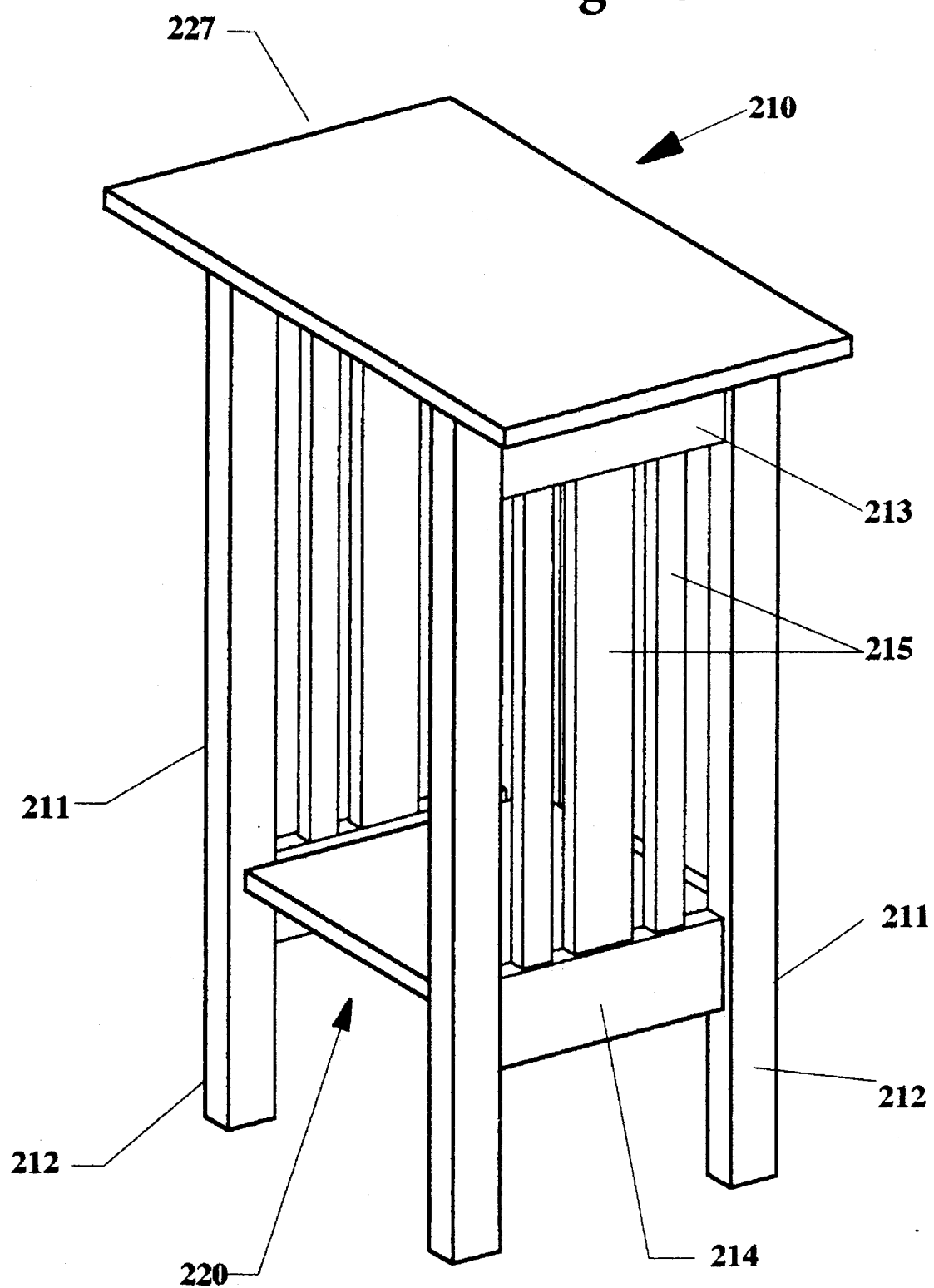
FIG. 16 is a perspective view of an assembled table in accordance with another embodiment of the invention.

In another preferred embodiment, the table illustrated by FIGS. 16–21 and generally indicated at 210 in FIG. 16 is assembled, using five flat surfaced, rectangular members provided with the features required for their assembly, in a predetermined manner, to construct tables of various sizes and also bookcases with shelves.

The two sides, generally indicated at 211 and the first members, are shown as prefabrications suitable for the use as the sides of tables. As shown, the sides 211 have front and rear supports 212 interconnected by upper and lower cross pieces 213 and 214. The upper edges of the cross pieces 213 are flush with the upper ends of the supports 212 while the lower cross piece 214 of each side is spaced from the bottom ends of the supports so that the latter serve as legs. The cross pieces are interconnected by laterally spaced, vertical members 215.

Figure 17:
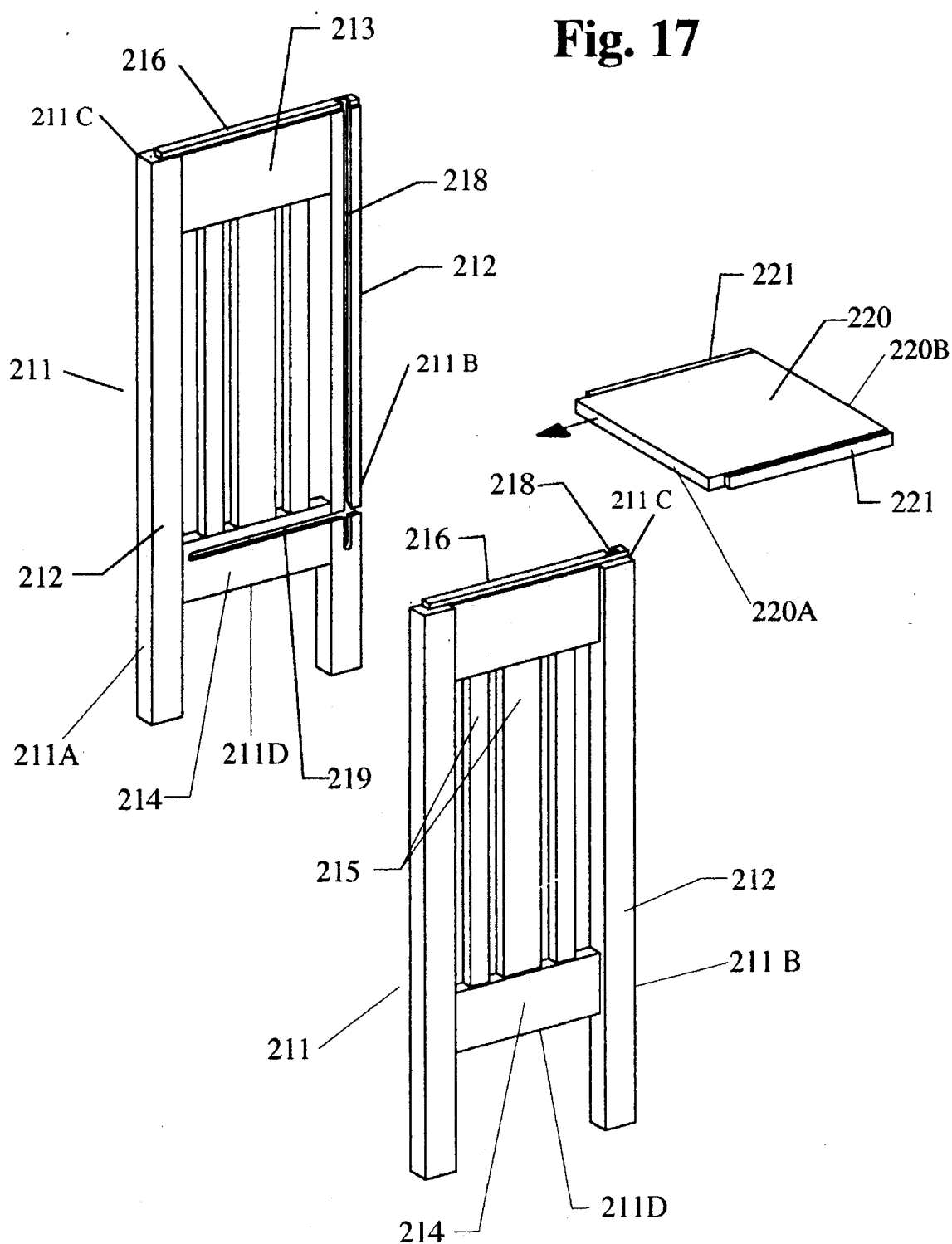
FIG. 17 is a perspective view of the two like sides and the shelf before assembly.

Referring to FIG. 17, the front supports 212 establish the first or front margins 211A of the sides 211 and the rear supports 212 establish the second or rear margins 211B thereof. The upper cross pieces 213 and the adjacent ends of the supports 212 are the first or upper margins 211C of the sides while the bottom margin 211D of each of the lower cross piece 214 defines the second or bottom margin of the sides.

The assembly features of each of the sides 211 include a self-locking tenon 216, extending along each upper margin 211C from the rear thereof, and terminating short of the first or front margin 211A to provide a flat surface 217, between the front edge and the proximate end of the tenon 216.

The surfaces of the sides 211 which face each other in the assembled table have vertical, self-locking mortises 218, one for each rear support 212 and extending from the upper margin thereof towards the opposite margin but terminating in a plane inclusive of the central portion of the lower cross piece 214. Each side 211 also has a transverse, self-locking mortise 219 opening through the rear margin 211B and extending lengthwise of the lower cross piece 214 and terminating short of the front margin 211A. Each mortise 219 intersects the mortise 218 near the closed end thereof.

The shelf, generally indicated at 220, a third member, has self-locking tenons 221 extending from the rear edge 220B towards but terminating short of the front margin 220A. The tenons 221 are shaped and dimensioned to be slidably entered in and confined by the mortises 219 of the sides 211. With the leading edges of the tenons 221 seated against the closed ends of the mortises 219, the trailing ends of the tenons are then close to but not exposed in the mortises 218, see FIG. 18. The shelf 220 is then in a first position permitting use of the unobstructed mortise 218.

Figure 18:
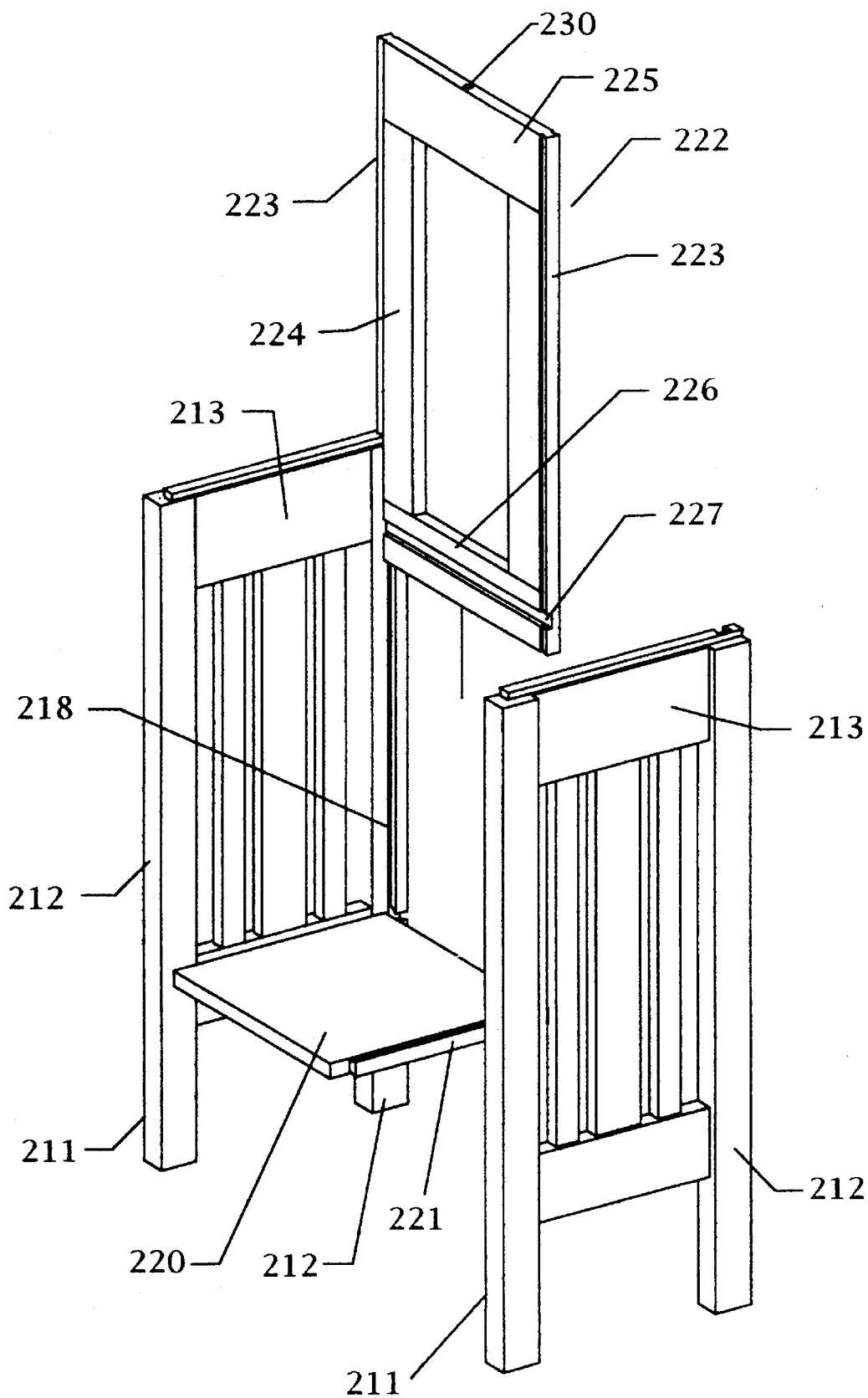
FIG. 18 is a like view of the two sides joined by the shelf and the back next to be connected to the sides and the shelf.
Figure 19:
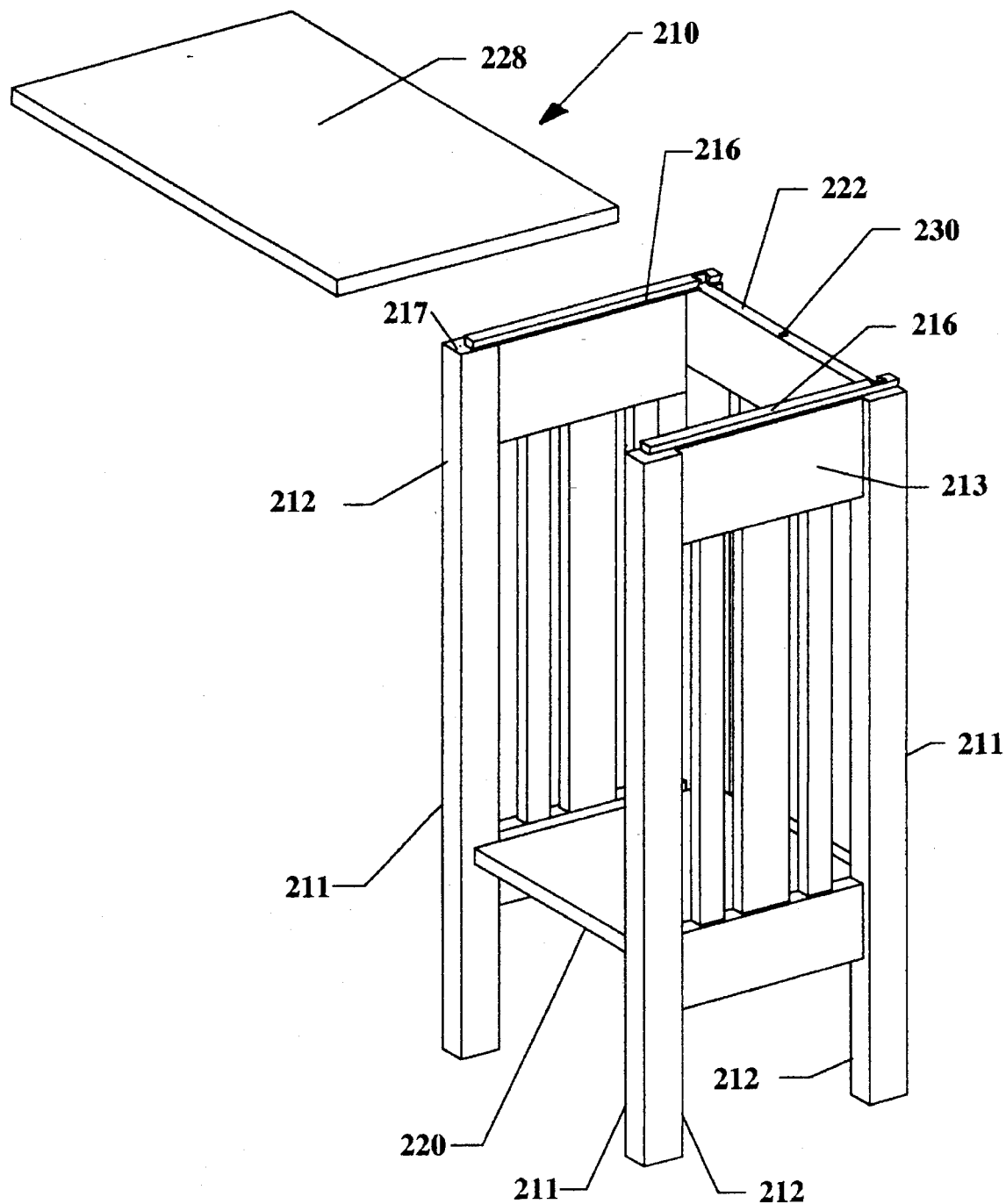
FIG. 19 is another like view but with the back held in place by the sides and shelf and with the top next to be connected to the sides.

The back generally indicated at 222, see FIG. 18, is shown as prefabricated and has a self-locking tenon 223 extending the full length of its sides 224 which are interconnected by upper and lower cross pieces 225 and 226. The lower cross piece 226 has a transverse groove or non-locking mortise 227 which is in a plane common to the mortises 219 when the back 222 is in its correct position. The shelf 220 is then pushed slightly rearwardly to seat its rear edge in the channel 227 then to hold the back in place, the rear edge serving as a tongue or non-locking tenon.

Figure 20:
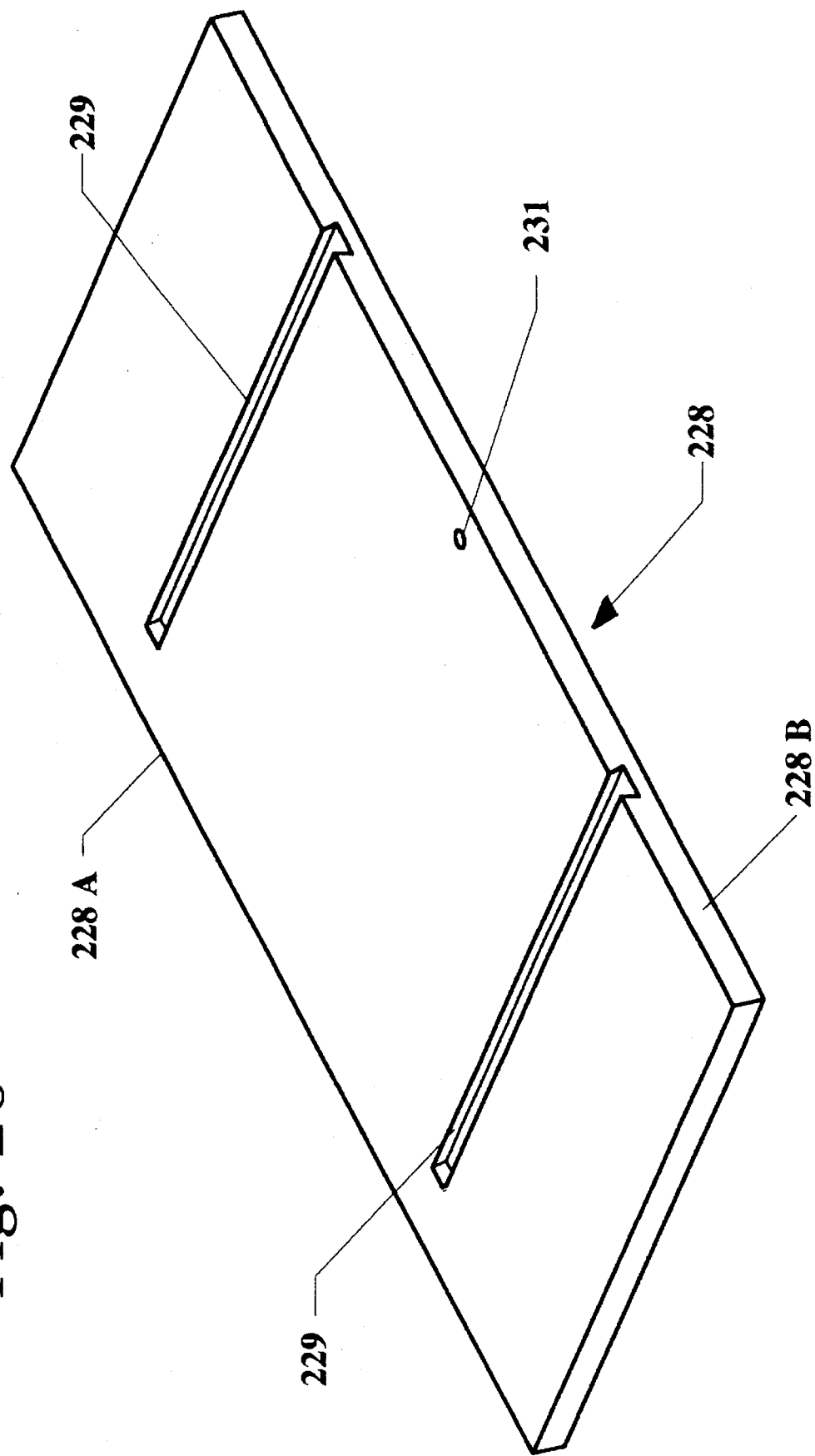
FIG. 20 is a perspective view of the undersurface of the table top.

The top, the fifth member, generally indicated at 228, has parallel self-locking mortises 229 in the upper surface thereof, see FIG. 20, extending from its second or rear margin 228B forwardly but terminating short of the front margin 228A. The mortises 229 are shaped and dimensioned to slidably receive and be held by the tenons 216 (FIG. 19) when the closed ends of the mortises 229 are seated against the ends of the tenons adjacent the first or front ends of the sides 211.

Figure 21:
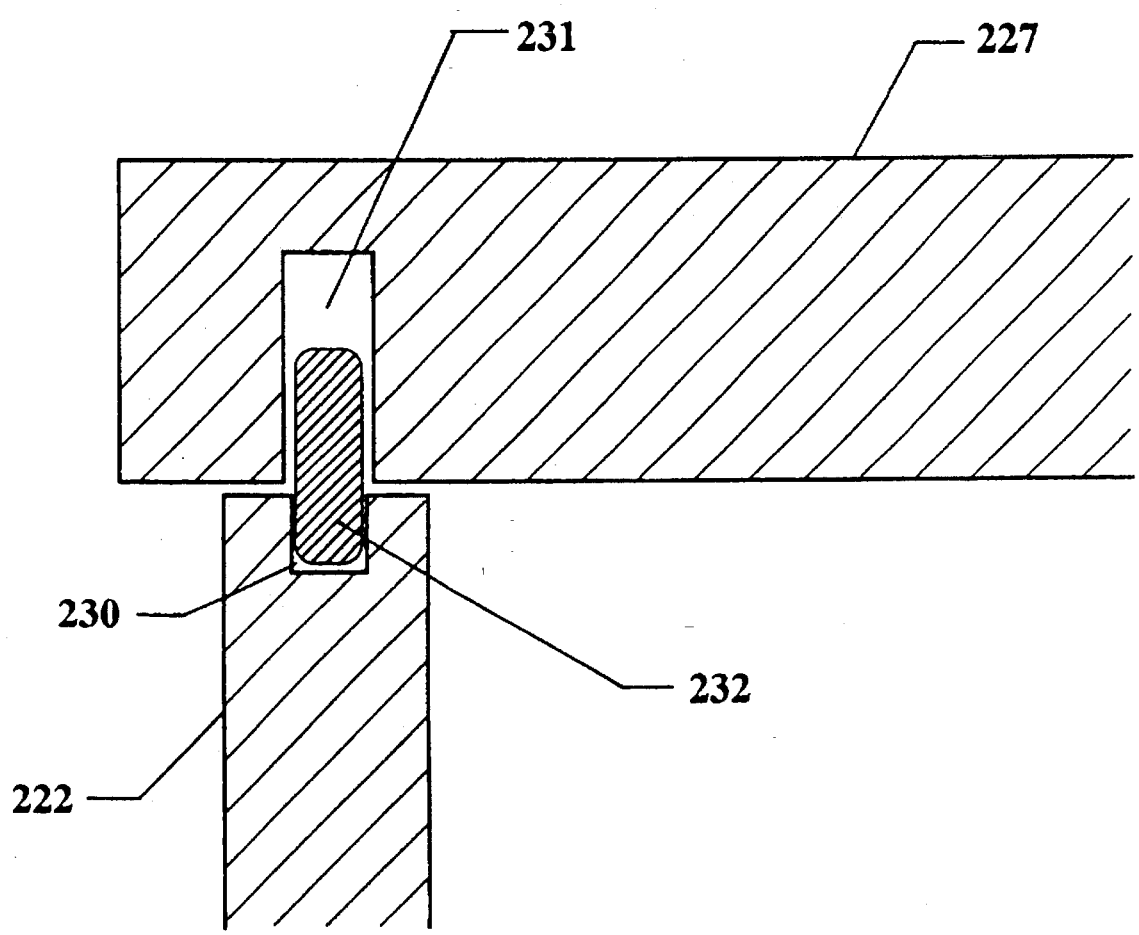
FIG. 21 is a fragmentary view illustrating the connecting element by which the top is connected to the back then to be held against moving.

It will be appreciated that, while the table 210 as thus described is a complete assembly, there is nothing other than friction to hold the top 228 against moving or being moved forwardly. For that reason, the back 222 is provided with a socket 230, see FIG. 19, so located that when the top is in the assembled position, the socket 23 1 in its under surface is in vertical alignment with the socket 230. In practice, a lock or anchor 232, see FIG. 21, is slidably fitted in the socket 231 and is of such a length that it does not protrude therefrom.

By positioning the partly assembled table 210 so that the top 228 can be connected to the sides 211 without having the locking element protruding, the top is slid into place and the now fully assembled table placed upright. The locking element 232 then slides into the socket 230 which is sufficiently shallow so that an anchoring portion still remains in the socket 23 1 thus unifying the assembly. The locking member 232 is preferably a short length of metal rod stock.

Should the table be too heavy to be moved conveniently between the above referred to positions, the locking element 232 may be releasably held in place, for example, by a thin metal strip which can be pulled free when the top is in position, then to free the locking element.

From the foregoing, the details of construction and the manner in which such articles as bookcases and tables are assembled are readily apparent. It will be appreciated that nothing is exposed that would indicate the assembly feature except when viewed from the back where the mortises and tenons connecting the top and the shelf to the sides can be seen.

While the FIGS. 16–21 illustrate a table in accordance with the invention, a similar construction establishes a case such as a bookcase.

The embodiment of the invention illustrated by FIGS. 22–27 is generally similar to that of FIGS. 16–21 and also utilizes five flat surfaced members. The illustrated embodiment is a table, generally indicated at 233.

Figure 22:
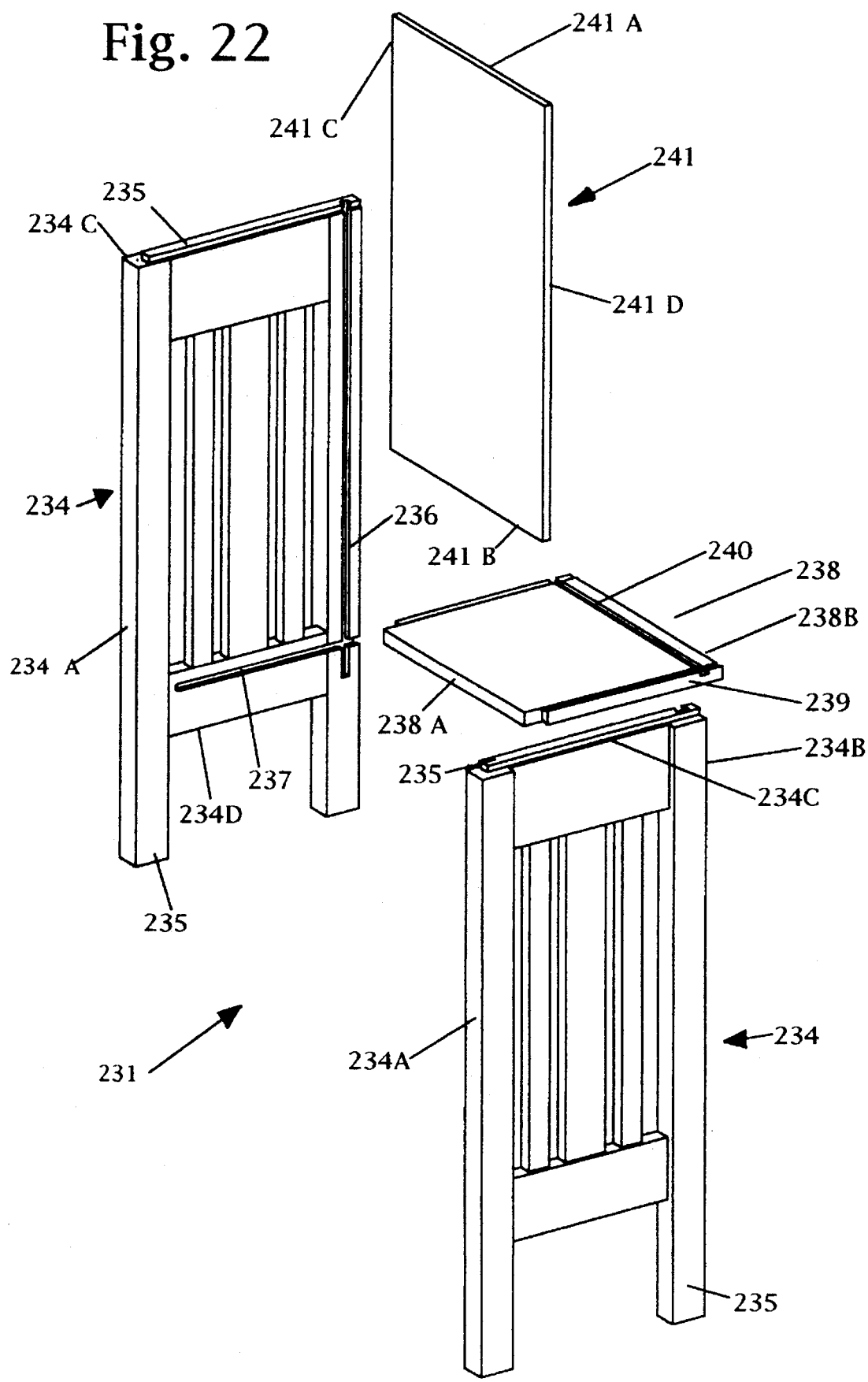
FIG. 22 is a perspective view of the sides, the shelf and the back separate from each other and showing the self-locking mortise and tenon components of another embodiment of the invention.

Two of the members are of the same size and are the sides or first members of the table and are generally indicated at 234. Except for the legs 235 of the sides 234, all the members are shown as rectangular. The surfaces of the sides 234 which face each other when positioned for assembly are provided with identical assembly features. Two sides 234 are shown in FIG. 22 but the second side is omitted from subsequent figures in order to make clear assembly details and sequences.

Among the assembly features are tenons 235. These are of the self-locking type as previously defined and these extend along the upper side margins 234C from the second or rear margins 234B towards but terminate short of the first or front margins 234A to provide a flat surface 234C adjacent the front margin 234A. Each side 234 also has a groove or non-locking mortise 236 adjacent the rear margin 234B opening through the tenon 235 and extending towards but terminating short of the second or bottom margin 234D. The sides 234 also have self-locking mortises 237 extending from the rear margins 234B, intersecting the channels 236 and terminating short of the front margins 234A.

The third member is shown as a shelf, generally indicated at 238 and has a self-locking tenon 239 extending along each of its side margins towards but terminating short of the front margin 238A. The tenons 239 are shaped and dimensioned to be entered in the self-locking mortises 237 of the sides 234 to establish concealed, self-locking joints between the sides 234 and the shelf 238. The tenons 239 are of a length such that when their leading ends are seated against the closed ends of the mortises 237, the trailing or rear margin 238B of the shelf 238 is ahead of but close to the non-locking mortises 236, see FIG. 23. In addition, the shelf 238 has a transverse groove or non-locking mortise 240 parallel and close to the rear margin 238B.

The fourth member is the back, is generally indicated at 241 and is shaped and dimensioned so that its side margins 241C and 241D serve as tenons to be slidably entered in the non-locking mortises 236 of the sides 234 and so that when the bottom margin 241B of the back 241 is seated against the closed ends of the channels 236, see FIG. 23, the upper or first margin 241A is below the self-locking tenons 235 of the sides 234 and its bottom or second margin blocks the mortises 237 and prevents rearward movement of the shelf 238 from its first operative position.

Figure 25:
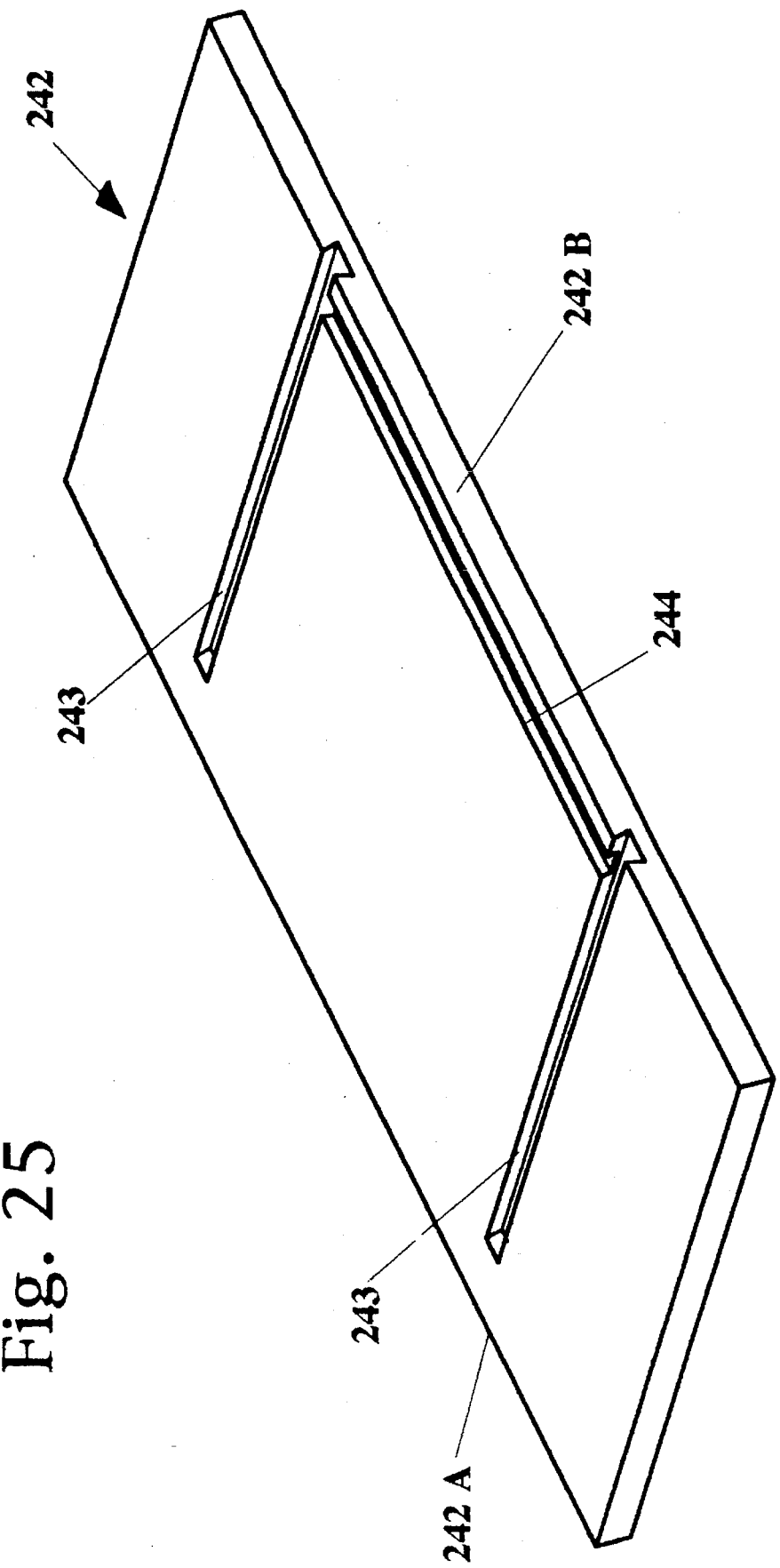
FIG. 25 is a perspective view of the under surface of the top.

The fifth member is the top, which does not have to be rectangular, is generally indicated at 242 and has a pair of laterally spaced, parallel self-locking mortises 243 in its undersurface, see FIG. 25, extending from the second or rear end 242B towards but terminating short of the front end 242A. The mortises 243 are shaped and dimensioned to slidably receive and retain the tenons 235 of the sides 234 to establish self-locking joints the rear ends of which are visible only when the assembly is viewed from the back of the table but do not protrude. The top 242 also has a channel or non-locking mortise 244 parallel to and close to the rear end 242B and it also opens into the mortises 243 and is dimensioned to receive the upper end 241A of the back 240 as a tongue or non-locking tenon.

Figure 23:
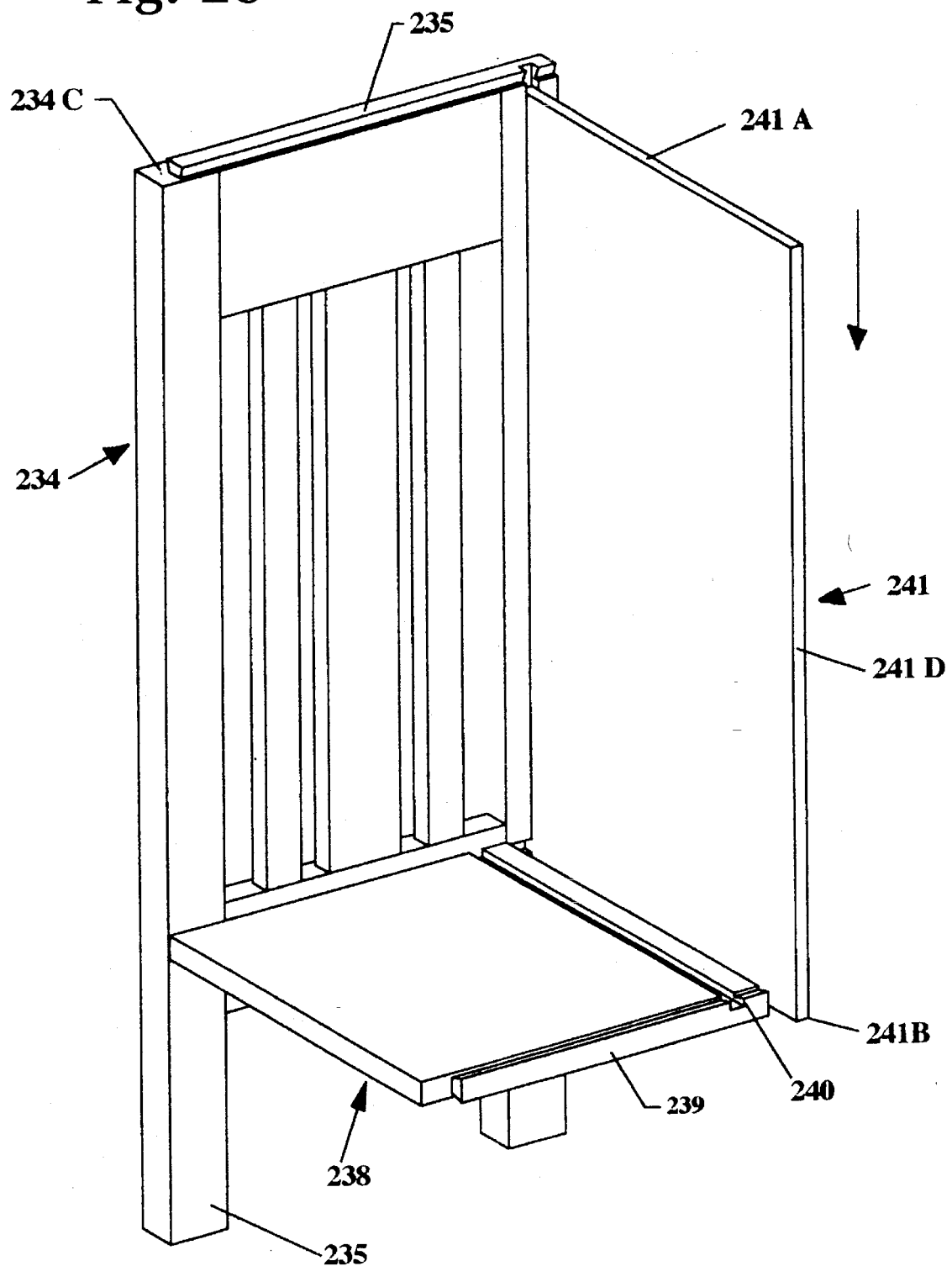
FIG. 23 is a perspective view of another embodiment of the invention on an increase in scale to show more clearly the position of the back when holding the shelf in its first position.
Figure 24:
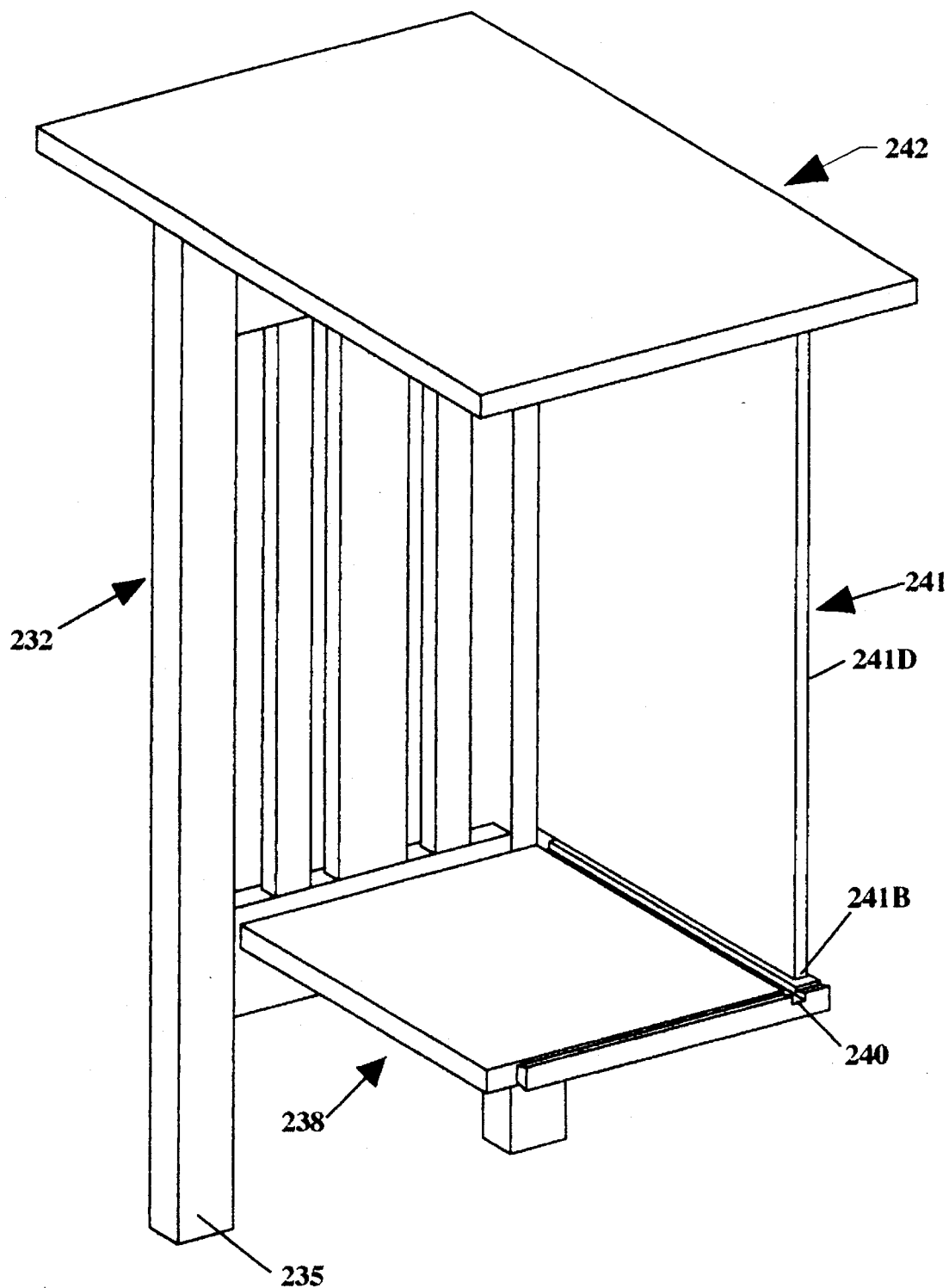
FIG. 24 is a similar view but with the back raised to enable the shelf to be moved into its second position.

With the two sides 234 interconnected by the shelf 238 in its first or forward position, see FIG. 23, the back 221 then has its margins 221C and 221D entered in the upper ends of the channels 236 of the sides 234 and slid downwardly until seated in the closed ends thereof. The back 241 then blocks movement of the shelf 238 rearwardly from its first position.

It will also be noted, see FIG. 23, that the upper end 241A of the back 240 is below the tenons 235 of the sides 234 permitting the mortises 243 of the top 242 to be brought into slidable engagement with the tenons 235 of the sides 234 and slid rearwardly until the closed ends of the mortises 243 seat against the forward ends of the tenons 235. When the top 242 is thus positioned, the channel 244 is open with respect to the channels 236 of the sides 235. If the back 241 is now raised until its upper end 221A is seated in the channel 244, its second or bottom end 241D is so raised that the shelf 238 can be slid rearwardly from its first position into its second position in which the bottom end 241D of the back 241 can now be seated in the channel 240 of the shelf 238 thus holding the shelf 238 against being moved and supporting the back 241. In addition, the upper or first end 241A of the back 241 is entered in the channel 244 so that the top 242 is now held against being moved so that the several components of an assembly in accordance with this embodiment of the invention are locked together.

Figure 26:
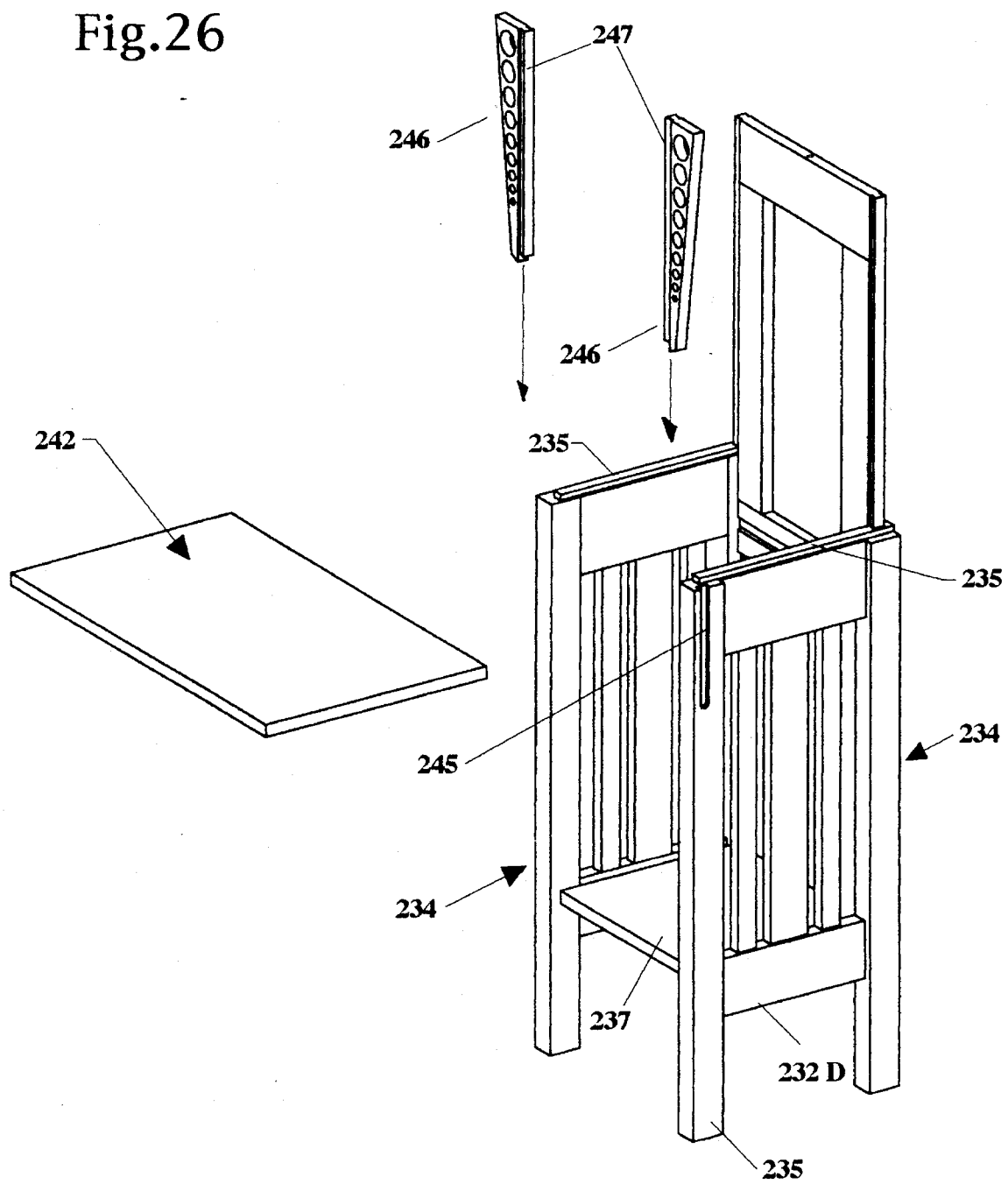
FIG. 26 is a perspective and partly exploded view illustrating the addition of attachments to the outer sides of the assembly.
Figure 27:
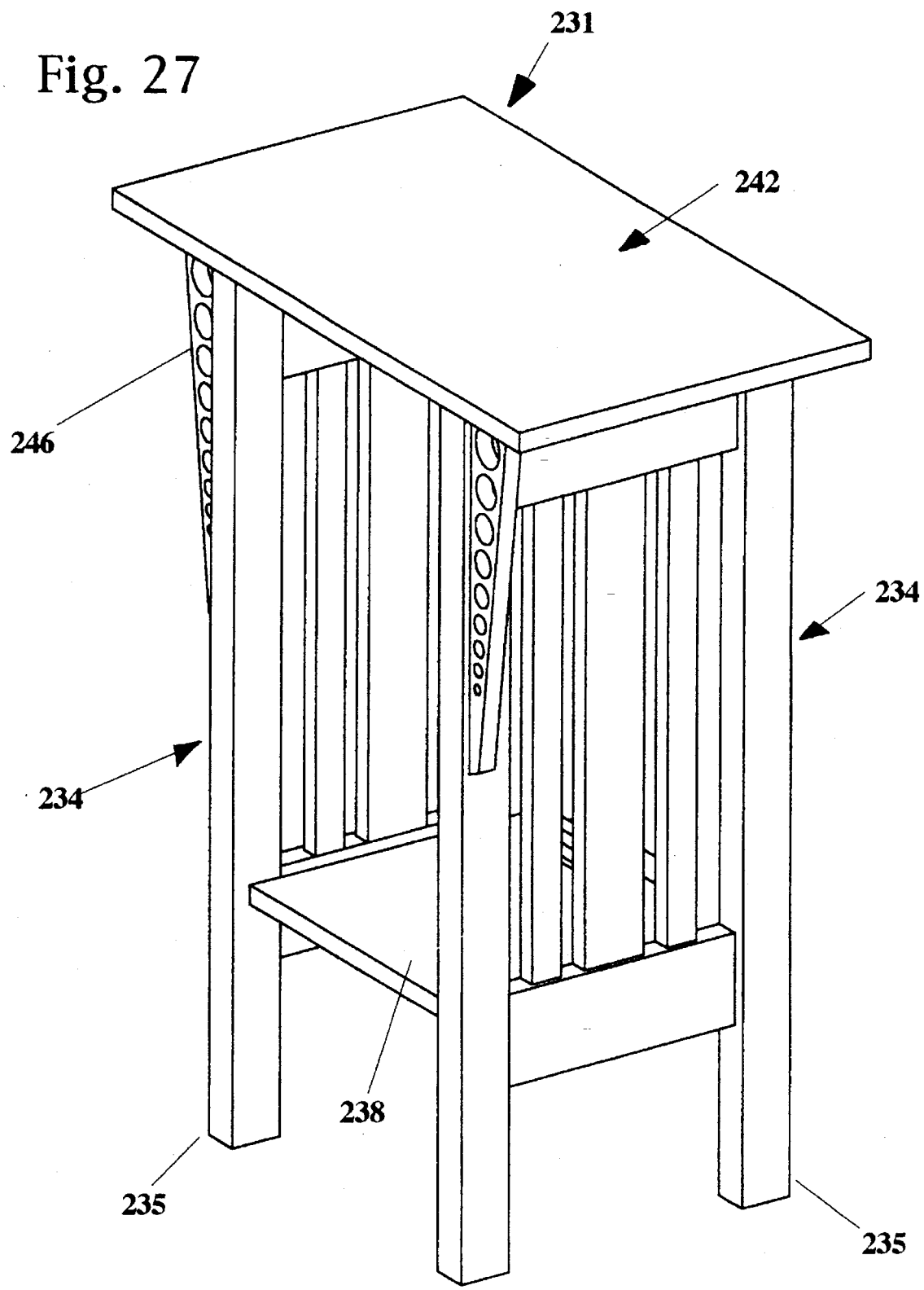
FIG. 27 is a perspective view of the fully assembled table.

Referring to FIG. 26, the outer surfaces of the sides 234 can have upwardly opening self-locking mortises 245 extending part way towards the bottom margins for the reception of articles which are to be secured thereto with the ornaments 246 but one example thereof. Each such article has a tenon 237 for entry in the appropriate one of the mortises 245 then to establish a self-locking joint under the top 242.

The embodiments of the invention illustrated by FIGS. 16–27 are tables but it will be readily appreciated that bookcases in accordance with the present invention are generally similar except that bookcases utilize a plurality of shelves.

While the use of rectangular sides, backs, bottoms and shelves is preferred, such members may have other shapes provided that straight edges are provided which when butted against flat surfaces can be joined by self-locking mortise and tenon joints in some articles of furniture and, by joints of established by non-locking mortises and tenons.

From the foregoing, it will be appreciated that tables, bookcases, drawers, chairs, love seats, sofas and the like in accordance with the invention may be of various shapes, materials and designs as long as there are at least three types of members one of which is slidably connected to another for movement between first and second positions, in the first of which a third type of member can be added and in the second position of which the three types become locked together.

I claim:

1. A ready to assemble article of furniture including at least three members detachably connected by mortises and tenons each of said members having a pair of opposite end margins, a pair of opposite side margins and opposite sides bordered by the end and side margins, one of said members being the first member, one of the sides of the first member provided with a first mortise open with respect to at least one of said end margins and extending at least part way towards the opposite end margin (margins), said first member also having a second mortise open with respect to one of said side margins thereof and extending towards the opposite side margin, intersecting said first mortise and extending towards the opposite side margin and beyond said first mortise, second member being the second member and provided with a tenon extending along one side margin (portion) and of a length and shape liar entry in the first mortise of the first member and for sliding movement therein, in one direction into proximity to one (the opposite) end margin of the first member, said (another) second member then in the first operative position thereof and the tenon thereof in a non-obstructing position relative to the second mortise and, when slid, in the opposite direction to a predetermined extent into proximity to the (said one) opposite end margin of the first member establishing (to establish) the second operative position of said second member with the second mortise of the first member obstructed, and an third member which is the third member provided with a tenon for sliding entry into, the second mortise of the first member into an operative position when said second (another) member is in the first operative position thereof and held in said operative position when the second member is in the second operative position thereof (with the tenon retained in the operative position thereof) then to establish an assembly, at least one of the mortises of the first member and the tenon to be entered therein being a self-locking mortise and tenon respectively.

2. The ready to assemble article of furniture of claim 1 in which at least said one side of each member is flat surfaced.

3. The ready to assemble article of furniture according to claim 2 wherein a slot is provided in said third member, said slot receiving one end portion of said second member when said third member is inserted into said second mortise of the fist member to a position wherein the slot is aligned with the first mortise while the second member is in the non-obstructing position thereof.

4. The ready to assemble article of furniture according to claim 3, wherein said end portion of said second member projects from one end margin thereof, said portion dimensioned to extend into the slot of the third member when said second member is in the non-obstructing position thereof.

5. The ready to assemble article of furniture according to claim 2 wherein the first mortise terminates short of the opposite end margin of the first member, the tenon on said second member terminates short of the opposite end margin thereof, said one side margin of said second member having a flat surface and disposed to fit against the flat surface of the first member between the closed end of the first mortise and said one end margin of said first member.

6. The ready to assemble article of furniture according to claim 2 wherein the second mortise terminates short of the opposite side margin of said first member, and the tenon on the third member terminates short of the side margins thereof, the end margin of said third member having a flat surface disposed to fit against the flat surface of the first member beyond the terminal end of the second mortise.

7. The ready to assemble article of furniture according to claim 2, wherein a fourth member is provided, said fourth member being the mirror image of said first member, a second tenon projects from the opposite side margin of said second member, said second tenon having a length corresponding to the length of the first tenon on said second member, said second tenon being slidably mounted in the first mortise of the fourth member, a second tenon is on the opposite side margin of the additional member, the second tenon on the third member having a length corresponding to the length of the first tenon on the third member, the second tenon on the third member being slidably mounted in the second mortise of the fourth member.

8. The ready to assemble article of furniture according to claim 7, wherein the article of furniture is a chair, the first and fourth members constitute the sides of the chair, said second member provides the seat for the chair, and the third member provides the back of the chair.

9. A ready to assemble article of furniture according to claim 2, wherein transversely aligned slots are provided in the opposite side margins of the third member, said slots intersecting the tenons on the opposite side margin of said third member, said slots being longitudinally aligned with the first mortises in the first and fourth members when the third member has been inserted into the second mortises of said first and fourth members to the unobstructed position relative to the second mortises in said first and fourth members, the said second member having portions projecting from said one edge margin and dimensioned to enter the transversely aligned slots in said third member when said second member has been moved to the obstructed position thereof.

10. The ready to assemble article of furniture of claim 8, wherein the article is selectively a sofa and love seat wherein the first and fourth members provide the ends thereof, said second member being the seat thereof and the third member being the back the length of the back and the width of the seat determining whether the assembled furniture is a love seat or sofa.

11. The ready to assemble article of furniture of claim 2 in which the second mortise is adjacent said one end margin of the first member.

12. The ready to assemble article of furniture of claim 2 in which the first member is a table top.

13. The ready to assemble article of claim 2 wherein the article also includes fourth and fifth members, the fourth and fifth members each having a pair of opposite end margins, a pair of opposite side margins and a flat surfaced side bordered by said end and side margins, the fourth member being the mirror image of the first member, the first mortise of the first and fourth members opening through both end margins thereof, and the second mortises adjacent the corresponding opposite end margins thereof, a tenon projects from one end margin of each of said first and fourth members, and is equal in length to the first mortise, both side margins of said second member serving as tenons insertable and slidable in said first mortises, a tenon projects from each side portion of the third member for slidable entry into the second mortises of the first and fourth members, said fifth member provided with mortises, one adjacent each end margin and opening through a side margin, said fifth member also having a transverse mortise opening into the first named mortises thereof and spaced from a side margin to be in the plane of the first mortises of the first and fourth members when the article is assembled, one end margin of the second member dimensioned for entry into the transverse mortise of the fifth member when said second member is slid relative to the first and fourth members from a position in which the mortises of the first and fourth members are unobstructed into positions obstructing said mortises, the opposite end margin of said second member then in said obstructing position.

14. The ready to assemble article of furniture in accordance with claim 13 and means operable to lock the second and third members together when said second member is in said obstructing position.

15. The ready to assemble article of furniture in accordance with claim 13 wherein the opposite end margin of said second member has a slot which in the obstructing position of said second member underlies the third member and the side portion of the third member adjacent said slot has a projecting tab entered to said underlying slot in the second operative position of said another member.

16. The ready to assemble article of furniture in accordance with claim 15 wherein said second member is sufficiently resiliently flexible manually to enable the end margin adjacent said second member to be depressed to an extent enabling said end margin of said second member to be positioned under said projecting tab when said third member is moved into the second operative position thereof.

17. The ready to assemble article of furniture in accordance with claim 15 wherein the opposite end margin of said second member has a slot so offset relative to the mortises of the first and fourth members that the projecting tab of the third member does not register with said slot and said third member is sufficiently manually flexible to enable the projecting tab to snap into the slot when manually depressed.

18. The ready to assemble article of furniture in accordance with claim 13 wherein the opposite end margin of said second member has a socket which when the second member is in the first operative position thereof is in a plane inclusive of the mortises of the first and fourth members, the third member has a socket opening through a side margin thereof located to register with said socket, and a locking element dimensioned to fit both sockets is of a length to be seated in the socket of said second member and to extend into the socket of the additional member then to lock said second and third members against movement.

19. The ready to assemble article of furniture in accordance with claim 18 in which the socket in the third member is of sufficient length to contain the full length of the locking member and the locking element is a length of metal rod stock.

20. The ready to assemble article of furniture in accordance with claim 13 in which the mortises of the first and fourth members are longer than the tenons of the third member thus enabling the projecting tab of the third member to be raised out of the path of said second member.

21. The ready to assemble article in accordance with claim 13 in which the assembled article is a box, the first and fourth members being the side walls thereof, said second member is the bottom of the box, the third member is the back wall of the box and the fifth member is the front wall thereof.

22. The ready to assemble article of furniture in accordance with claim 21 wherein the end margins of the front wall of the box extend laterally beyond the side walls to establish the box as a drawer.

23. The article of furniture in accordance with claim 21 wherein a fourth and a fifth member are provided each of which has first and second end margins, first and second side margins and opposite sides bordered by said margins, the fourth member being the mirror image of the first member, each side margin of the second member has a tenon extending from one end margin towards the opposite end margin, said mortises and tenons being self-locking mortises and tenons, a tenon projects from both side margins of the third member, said tenons of the third member and the second mortises of the first and fourth members are self-locking mortises and tenons, the length of the tenons of the additional member less than the length of said second mortises, a tenon projects from one end margin of each of the first and fourth members and extending towards but terminating short of the opposite end margin, and the fifth member has mortises, one for each tenon of the first and fourth members which are self-locking and extend from one end margin towards but terminate short of the opposite end margin thereof.

24. The article of furniture in accordance with claim 23 wherein means are provided to lock the fifth member to said second member when the fifth member is in a predetermined position relative thereto, said fifth member constituting a top.

25. The article of furniture in accordance with claim 23 in which said second member has a transverse non-locking mortise exposed to receive an end portion of the third member when said second member is in a position to obstruct the second mortise of the first and fourth members then to support the third member with the opposite end margin thereof in the plane of the corresponding portions of the first and fourth members.

26. The article of furniture in accordance with claim 23 wherein the end margins of each of the first and fourth members through which the second mortises open has an upwardly opening socket, the fifth member has a downwardly opening socket which registers with the first named socket when the closed end of the mortises of the fifth member are in engagement with the tenons extending along side margins of the first and fourth member and a locking member seated in the first named socket extends into the second named socket.

27. The article of furniture in accordance with claim 23 wherein the article is selectively a bookcase or a table, the first and fourth members are the sides, said another member is a shelf, the third member is the back and the fifth member is a top.

28. The article of furniture in accordance with claim 27 in which at least one of the opposite sides has a mortise on the exposed surface thereof which extends downwardly from and opens through an end margin thereof, a sixth member has a tenon, the tenon and the mortise establishing a self-locking joint and the top member is dimensioned to overlie the sixth member.

* * * * *